(12) United States Patent
Wang

(10) Patent No.: US 10,623,755 B2
(45) Date of Patent: Apr. 14, 2020

(54) END OF SEQUENCE AND END OF BITSTREAM NAL UNITS IN SEPARATE FILE TRACKS

(71) Applicant: QUALCOMM Incorporated, San Diego, CA (US)

(72) Inventor: Ye-Kui Wang, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 169 days.

(21) Appl. No.: 15/601,233

(22) Filed: May 22, 2017

(65) Prior Publication Data

US 2017/0339421 A1    Nov. 23, 2017

Related U.S. Application Data

(60) Provisional application No. 62/340,437, filed on May 23, 2016.

(51) Int. Cl.
| | | |
|---|---|---|
| *H04N 19/105* | (2014.01) | |
| *H04N 19/159* | (2014.01) | |
| *H04N 19/169* | (2014.01) | |
| *H04N 19/30* | (2014.01) | |
| *H04N 19/70* | (2014.01) | |
| *H04N 21/854* | (2011.01) | |
| *H04N 19/172* | (2014.01) | |

(52) U.S. Cl.
CPC ......... *H04N 19/188* (2014.11); *H04N 19/105* (2014.11); *H04N 19/159* (2014.11); *H04N 19/30* (2014.11); *H04N 19/70* (2014.11); *H04N 21/85406* (2013.01); *H04N 19/172* (2014.11)

(58) Field of Classification Search
CPC ... H04N 19/137; H04N 19/105; H04N 19/119
See application file for complete search history.

(56) References Cited

U.S. PATENT DOCUMENTS 8,514,942 B2 *   8/2013  Goel ................... H04N 19/176
                                                           375/240.21
9,191,651 B2 * 11/2015  Hwangbo ............ H04N 13/359
(Continued)

FOREIGN PATENT DOCUMENTS

WO       2015142725 A1    9/2015

OTHER PUBLICATIONS

"Draft DoC on ISO/IEC DIS 14496-15 4th edition", 114, MPEG Meeting; Feb. 22, 2016-Feb. 26, 2016; San Diego; (Motion Picture Expert Group or ISO/IEC JTC1/SC29/WG11 ), No. N15927, Mar. 2, 2016, XP030022601, 42 pages.

(Continued)

*Primary Examiner* — Irfan Habib
(74) *Attorney, Agent, or Firm* — Shumaker & Sieffert, P.A.

(57) ABSTRACT

A device includes, in a first track of the file, a first end of sequence (EOS) network abstraction layer (NAL) unit for a coded video sequence of a bitstream. The first EOS NAL unit is in a first access unit of the coded video sequence. The device also includes, in a second track of the file, a second EOS NAL unit for the coded video sequence. The second EOS NAL unit is in a second access unit of the coded video sequence, the second EOS NAL unit being different from the first EOS NAL unit. The device may perform similar actions for end of bitstream (EOB) NAL units.

6 Claims, 10 Drawing Sheets

(56) References Cited

U.S. PATENT DOCUMENTS

| | | | |
|---|---|---|---|
| 9,451,284 B2* | 9/2016 | Wang | H04N 19/70 |
| 9,641,862 B2* | 5/2017 | Hannuksela | H04N 19/119 |
| 9,788,022 B2* | 10/2017 | Wang | H04N 21/23424 |
| 9,794,595 B2* | 10/2017 | Hendry | H04N 19/124 |
| 9,866,852 B2* | 1/2018 | Ramasubramonian | H04N 19/188 |
| 10,284,867 B2* | 5/2019 | Hannuksela | H04N 19/33 |
| 2009/0161762 A1* | 6/2009 | Jun | H04N 21/234327 375/240.16 |
| 2010/0098174 A1* | 4/2010 | Adachi | H04N 19/46 375/240.25 |
| 2010/0153395 A1* | 6/2010 | Hannuksela | G11B 27/102 707/737 |
| 2013/0195201 A1* | 8/2013 | Boyce | H04N 19/44 375/240.25 |
| 2013/0266075 A1* | 10/2013 | Wang | H04N 19/70 375/240.25 |
| 2014/0003489 A1* | 1/2014 | Hannuksela | H04N 19/70 375/240.02 |
| 2014/0086324 A1* | 3/2014 | Ramasubramonian | H04N 19/58 375/240.13 |
| 2014/0092964 A1* | 4/2014 | Ugur | H04N 19/46 375/240.12 |
| 2014/0098868 A1* | 4/2014 | Wang | H04N 19/31 375/240.13 |
| 2014/0161181 A1* | 6/2014 | Samuelsson | H04N 19/503 375/240.12 |
| 2014/0205021 A1* | 7/2014 | Hannuksela | H04N 19/463 375/240.26 |
| 2014/0218473 A1* | 8/2014 | Hannuksela | H04N 19/597 348/43 |
| 2014/0301476 A1* | 10/2014 | Deshpande | H04N 19/70 375/240.25 |
| 2014/0301485 A1* | 10/2014 | Ramasubramonian | H04N 19/895 375/240.27 |
| 2014/0355692 A1* | 12/2014 | Ramasubramonian | H04N 19/597 375/240.26 |
| 2015/0016547 A1* | 1/2015 | Tabatabai | H04N 19/423 375/240.26 |
| 2015/0078456 A1* | 3/2015 | Hannuksela | H04N 19/70 375/240.25 |
| 2015/0103886 A1* | 4/2015 | He | H04N 19/188 375/240.02 |
| 2015/0103926 A1* | 4/2015 | Hannuksela | H04N 19/119 375/240.26 |
| 2015/0110473 A1* | 4/2015 | Wang | H04N 19/136 386/341 |
| 2015/0131744 A1* | 5/2015 | Samuelsson | H04N 19/70 375/240.26 |
| 2015/0264404 A1* | 9/2015 | Hannuksela | H04N 19/70 375/240.16 |
| 2016/0088306 A1* | 3/2016 | Sjoberg | H04N 19/187 375/240.02 |
| 2016/0212439 A1* | 7/2016 | Hannuksela | H04N 19/33 |
| 2016/0234516 A1* | 8/2016 | Hendry | H04N 19/187 |
| 2016/0241850 A1* | 8/2016 | Deshpande | H04N 19/70 |
| 2017/0094288 A1* | 3/2017 | Hannuksela | H04N 19/105 |
| 2017/0237999 A1* | 8/2017 | Hendry | H04N 19/30 375/240.26 |
| 2017/0347026 A1* | 11/2017 | Hannuksela | G09G 5/14 |
| 2018/0007395 A1* | 1/2018 | Ugur | H04N 21/21805 |

OTHER PUBLICATIONS

Hendry et al., "Comments on ISO/IEC 14496-15," 114, MPEG Meeting; Feb. 22, 2016-Feb. 26, 2016; San Diego; (Motion Picture Expert Group or ISO/IEC JTC1/SC29/WG11),, No. m37915, Feb. 18, 2016 (Feb. 18, 2016), XP030066281, 4 pages.

International Search Report and Written Opinion—PCT/US2017/033925—ISA/EPO—dated Aug. 11, 2017.

"Study of ISO/IEC DIS 14496-15 4th Edition", 113, MPEG Meeting, Oct. 19, 2015-Oct. 23, 2015; Geneva; (Motion Picture Expert Group or ISO/IEC JTC1/SC29/WG11), No. N15640, Dec. 7, 2015, 172 pages, XP030022328.

Wang Y-K., "Comments on ISO/IEC 14496-15," Motion Picture Expert Group or ISO/IEC JTC1/SC29/WG11; 115. MPEG Meeting; May 30, 2016-Jun. 3, 2016; Geneva; No. M38688, May 31, 2016 (May 31, 2016), 14 Pages, XP030067040.

"Part 15: Carriage of network abstraction layer (NAL) unit structured video in ISO base media file format," Information technology—Coding of audio visual objects, ISO/IEC 14496-15, Jul. 1, 2014, 124 pp.

"Part 12: ISO base media file format Information technology—Coding of Audio visual objects," Information technology—Coding of audio visual objects, ISO/IEC 14496-12, Feb. 20, 2015, 366 pp.

"Information Technology—Coding of Audio-Visual Objects Part 12: ISO Base Media File Format," International Standard ISO/IEC 14496-12, Third edition, Oct. 15, 2008, 120 pp.

ITU-T H.265, Series H: Audiovisual and Multimedia Systems, Infrastructure of audiovisual services—Coding of moving video, Advanced video coding for generic audiovisual services, The International Telecommunication Union. Apr. 2015, 634 pp.

"IEEE Std 802.15.1, Part 15.1: Wireless medium access control (MAC) and physical layer (PHY) specifications for wireless personal area networks (WPANs)," IEEE Standards Association, Revision of IEEE Std. 802.15.1-2002; 2005, 600 pp.

3GPP "Technical Specification Group Services and System Aspects; Transparent end-to-end packet switched streaming service (PSS);" 3GPP TS 26.244, version 9.1.0, Mar. 2010, 55 pp.

International Preliminary Report on Patentability—PCT/US2017/033925, The International Bureau of WIPO—Geneva, Switzerland, Dec. 6, 2018, 9 pgs.

* cited by examiner

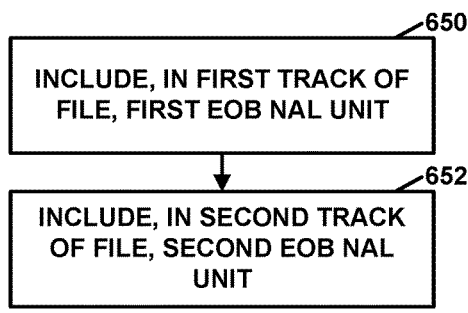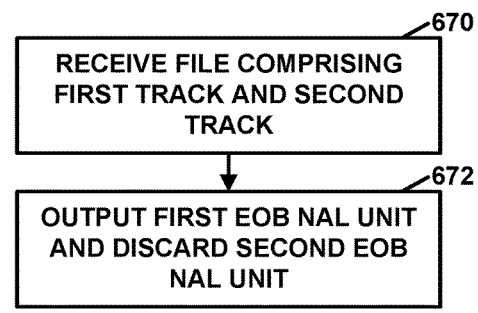
FIG. 10A                    FIG. 10B

END OF SEQUENCE AND END OF BITSTREAM NAL UNITS IN SEPARATE FILE TRACKS

This application claims the benefit of U.S. Provisional Patent Application 62/340,437, filed May 23, 2016, the entire content of which is incorporated by reference.

TECHNICAL FIELD

This disclosure relates to computing devices that performing video coding and use file formats for coded video data.

BACKGROUND

Digital video capabilities can be incorporated into a wide range of devices, including digital televisions, digital direct broadcast systems, wireless broadcast systems, personal digital assistants (PDAs), laptop or desktop computers, tablet computers, e-book readers, digital cameras, digital recording devices, digital media players, video gaming devices, video game consoles, cellular or satellite radio telephones, so-called "smart phones," video teleconferencing devices, video streaming devices, and the like. Digital video devices implement video compression techniques, such as those described in the standards defined by MPEG-2, MPEG-4, ITU-T H.263, ITU-T H.264/MPEG-4, Part 10, Advanced Video Coding (AVC), ITU-T H.264, the High Efficiency Video Coding (HEVC) standard, and extensions of such standards. The video devices may transmit, receive, encode, decode, and/or store digital video information more efficiently by implementing such video compression techniques.

Video compression techniques perform spatial (intra-picture) prediction and/or temporal (inter-picture) prediction to reduce or remove redundancy inherent in video sequences. For block-based video coding, a video slice (i.e., a video frame or a portion of a video frame) may be partitioned into video blocks, which may also be referred to as treeblocks, coding units (CUs) and/or coding nodes. Video blocks in an intra-coded (I) slice of a picture are encoded using spatial prediction with respect to reference samples in neighboring blocks in the same picture. Video blocks in an inter-coded (P or B) slice of a picture may use spatial prediction with respect to reference samples in neighboring blocks in the same picture or temporal prediction with respect to reference samples in other reference pictures. Pictures may be referred to as frames, and reference pictures may be referred to as reference frames.

Spatial or temporal prediction results in a predictive block for a block to be coded. Residual data represents pixel differences between the original block to be coded and the predictive block. An inter-coded block is encoded according to a motion vector that points to a block of reference samples forming the predictive block, and the residual data indicating the difference between the coded block and the predictive block. An intra-coded block is encoded according to an intra-coding mode and the residual data. For further compression, the residual data may be transformed from the pixel domain to a transform domain, resulting in residual transform coefficients, which then may be quantized. The quantized transform coefficients, initially arranged in a two-dimensional array, may be scanned in order to produce a one-dimensional vector of transform coefficients, and entropy coding may be applied to achieve even more compression.

SUMMARY

One or more aspects of this disclosure relate to storage of video contents in file formats. For instance, the techniques of this disclosure may improve handling of end of sequence (EOS) Network Abstraction Layer (NAL) units and end of bitstream (EOB) NAL units for High Efficiency Video Coding (HEVC) and layered HEVC bitstreams carried in multiple tracks, where at least some temporal sub-layers are carried in different tracks.

In one example, this disclosure describes a method of generating a file for storage of video contents, the method comprising: including, in a first track of the file, a first EOS NAL unit for a coded video sequence of a bitstream, the first EOS NAL unit being in a first access unit of the coded video sequence; and including, in a second track of the file, a second EOS NAL unit for the coded video sequence, the second EOS NAL unit being in a second access unit of the coded video sequence, the second EOS NAL unit being different from the first EOS NAL unit, the first access unit and the second access unit belonging to different temporal sub-layers.

In another example, this disclosure describes a method of processing a file for storage of video contents, the method comprising: receiving a file comprising a first track and a second track, the first track including a first access unit of a coded video sequence of a bitstream, the second track including a second access unit of the coded video sequence, the first access unit including a first EOS NAL unit, the second access unit including a second EOS NAL unit, and the second EOS NAL unit being different from the first EOS NAL unit, the first access unit and the second access unit belonging to different temporal sub-layers; and outputting, based on a comparison of a time associated with the first EOS NAL unit and a time associated with the second EOS NAL unit, the first EOS NAL unit and discarding the second EOS NAL unit.

In another example, this disclosure describes a method of generating a file for storage of video contents, the method comprising: including, in a first track of the file, a first EOB NAL unit for a coded video sequence of a bitstream, the first EOB NAL unit being in a first access unit of the coded video sequence; and including, in a second track of the file, a second EOB NAL unit for the coded video sequence, the second EOB NAL unit being in a second access unit of the coded video sequence, the second EOB NAL unit being different from the first EOB NAL unit, and the first access unit and the second access unit belonging to different temporal sub-layers.

In another example, this disclosure describes a method of processing a file for storage of video content, the method comprising: receiving the file, the file comprising a first track and a second track, the first track including a first access unit of a coded video sequence of a bitstream, the second track including a second access unit of the coded video sequence, the first access unit including a first end of bitstream (EOB) network abstraction layer (NAL) unit, the second access unit including a second EOB NAL unit, the first access unit and the second access unit belonging to different temporal sub-layers; and outputting the first EOB NAL unit and discarding the second EOB NAL unit.

In another example, this disclosure describes a device for generating a file for storage of video contents, the device comprising: a memory configured to store the file for storage of video contents; and one or more processors configured to: include, in a first track of the file, a first EOS NAL unit for a coded video sequence of a bitstream, the first EOS NAL unit being in a first access unit of the coded video sequence; and include, in a second track of the file, a second EOS NAL unit for the coded video sequence, the second EOS NAL unit being in a second access unit of the coded video sequence, the second EOS NAL unit being different from the first EOS NAL unit, and the first access unit and the second access unit belonging to different temporal sub-layers.

In another example, this disclosure describes a device for processing a file for storage of video contents, the device comprising: a memory configured to store the file for storage of video contents; and one or more processors configured to: receive a file comprising a first track and a second track, the first track including a first access unit of a coded video sequence of a bitstream, the second track including a second access unit of the coded video sequence, the first access unit including a first EOS NAL unit, the second access unit including a second EOS NAL unit, the second EOS NAL unit being different from the first EOS NAL unit, the first access unit and the second access unit belonging to different temporal sub-layers; and output, based on a comparison of a time associated with the first EOS NAL unit and a time associated with the second EOS NAL unit, the first EOS NAL unit and discarding the second EOS NAL unit.

In another example, this disclosure describes a device for generating a file for storage of video contents, the device comprising: a memory configured to store the file for storage of video contents; and one or more processors configured to: include, in a first track of the file, a first EOB NAL unit for a coded video sequence of a bitstream, the first EOB NAL unit being in a first access unit of the CVS; and include, in a second track of the file, a second EOB NAL unit for the coded video sequence, the second EOB NAL unit being in a second access unit of the coded video sequence, the second EOB NAL unit being different from the first EOB NAL unit, and the first access unit and the second access unit belonging to different temporal sub-layers.

In another example, this disclosure includes a device for processing a file for storage of video contents, the device comprising: a memory configured to store the file for storage of video contents; and one or more processors configured to: receive a file comprising a first track and a second track, the first track including a first access unit of a coded video sequence of a bitstream, the second track including a second access unit of the coded video sequence, the first access unit including a first end of bitstream (EOB) network abstraction layer (NAL) unit, the second access unit including a second EOB NAL unit, the first access unit and the second access unit belonging to different temporal sub-layers; and output the first EOB NAL unit and discard the second EOB NAL unit.

In another example, this disclosure describes a device for generating a file for storage of video contents, the device comprising: means for including, in a first track of the file, a first EOS NAL unit for a coded video sequence of a bitstream, the first EOS NAL unit being in a first access unit of the coded video sequence; and means for including, in a second track of the file, a second EOS NAL unit for the coded video sequence, the second EOS NAL unit being in a second access unit of the coded video sequence, the second EOS NAL unit being different from the first EOS NAL unit, the first access unit and the second access unit belonging to different temporal sub-layers.

In another example, this disclosure describes a device for processing a file for storage of video contents, the device comprising: means for receiving a file comprising a first track and a second track, the first track including a first access unit of a coded video sequence of a bitstream, the second track including a second access unit of the coded video sequence, the first access unit including a first EOS NAL unit, the second access unit including a second EOS NAL unit, the second EOS NAL unit being different from the first EOS NAL unit, and the first access unit and the second access unit belonging to different temporal sub-layers; and means for outputting, based on a comparison of a time associated with the first EOS NAL unit and a time associated with the second EOS NAL unit, the first EOS NAL unit and discarding the second EOS NAL unit.

In another example, this disclosure describes a device for generating a file for storage of video contents, the device comprising: means for including, in a first track of the file, a first EOB NAL unit for a coded video sequence of a bitstream, the first EOB NAL unit being in a first access unit of the coded video sequence; and means for including, in a second track of the file, a second EOB NAL unit for the coded video sequence, the second EOB NAL unit being in a second access unit of the coded video sequence, the second EOB NAL unit being different from the first EOB NAL unit, and the first access unit and the second access unit belonging to different temporal sub-layers.

In another example, this disclosure describes a device for processing a file storing video content, the device comprising: means for receiving a file comprising a first track and a second track, the first track including a first access unit of a coded video sequence of a bitstream, the second track including a second access unit of the coded video sequence, the first access unit including a first EOB NAL unit, the second access unit including a second EOB NAL unit, and the first access unit and the second access unit belonging to different temporal sub-layers; and means for outputting the first EOB NAL unit and discarding the second EOB NAL unit.

In another example, this disclosure describes a computer-readable storage medium having instructions stored thereon that, when executed, cause a computing device to: include, in a first track of the file, a first EOS NAL unit for a coded video sequence of a bitstream, the first EOS NAL unit being in a first access unit of the coded video sequence; and include, in a second track of the file, a second EOS NAL unit for the coded video sequence, the second EOS NAL unit being in a second access unit of the coded video sequence, the second EOS NAL unit being different from the first EOS NAL unit, and the first access unit and the second access unit belonging to different temporal sub-layers.

In another example, this disclosure describes a computer-readable storage medium having instructions stored thereon that, when executed, cause a computing device for processing a file for storage of video contents to: receive the file, the file comprising a first track and a second track, the first track including a first access unit of a coded video sequence of a bitstream, the second track including a second access unit of the coded video sequence, the first access unit including a first EOS NAL unit, the second access unit including a second EOS NAL unit, the second EOS NAL unit being different from the first EOS NAL unit, and the first access unit and the second access unit belonging to different temporal sub-layers; and output, based on a comparison of a time associated with the first EOS NAL unit and a time associated with the second EOS NAL unit, the first EOS NAL unit and discarding the second EOS NAL unit.

In another example, this disclosure describes a computer-readable storage medium having instructions stored thereon that, when executed, cause a computing device for generating a file for storage of video contents to: include, in a first track of the file, a first EOB NAL unit for a coded video sequence of a bitstream, the first EOB NAL unit being in a first access unit of the coded video sequence; and include, in a second track of the file, a second EOB NAL unit for the coded video sequence, the second EOB NAL unit being in a second access unit of the coded video sequence, the second EOB NAL unit being different from the first EOB NAL unit, and the first access unit and the second access unit belonging to different temporal sub-layers.

In another example, this disclosure describes a computer-readable storage medium having instructions stored thereon that, when executed, cause a computing device for processing a file for storage of video contents to: receive the file, the file comprising a first track and a second track, the first track including a first access unit of a coded video sequence of a bitstream, the second track including a second access unit of the coded video sequence, the first access unit including a first EOB NAL unit, the second access unit including a second EOB NAL unit, the second EOS NAL unit being different from the first EOS NAL unit, and the first access unit and the second access unit belonging to different temporal sub-layers; and output the first EOB NAL unit and discard the second EOB NAL unit.

The details of one or more examples of the disclosure are set forth in the accompanying drawings and the description below. Other features, objects, and advantages will be apparent from the description, drawings, and claims.

BRIEF DESCRIPTION OF DRAWINGS

FIG. 10A is a flowchart illustrating an example operation for generating a file that includes EOB NAL units in multiple tracks, in accordance with one or more techniques of this disclosure.

FIG. 10B is a flowchart illustrating an example operation for processing a file that includes EOB NAL units in multiple tracks, in accordance with one or more techniques of this disclosure.

DETAILED DESCRIPTION

Figure 1:
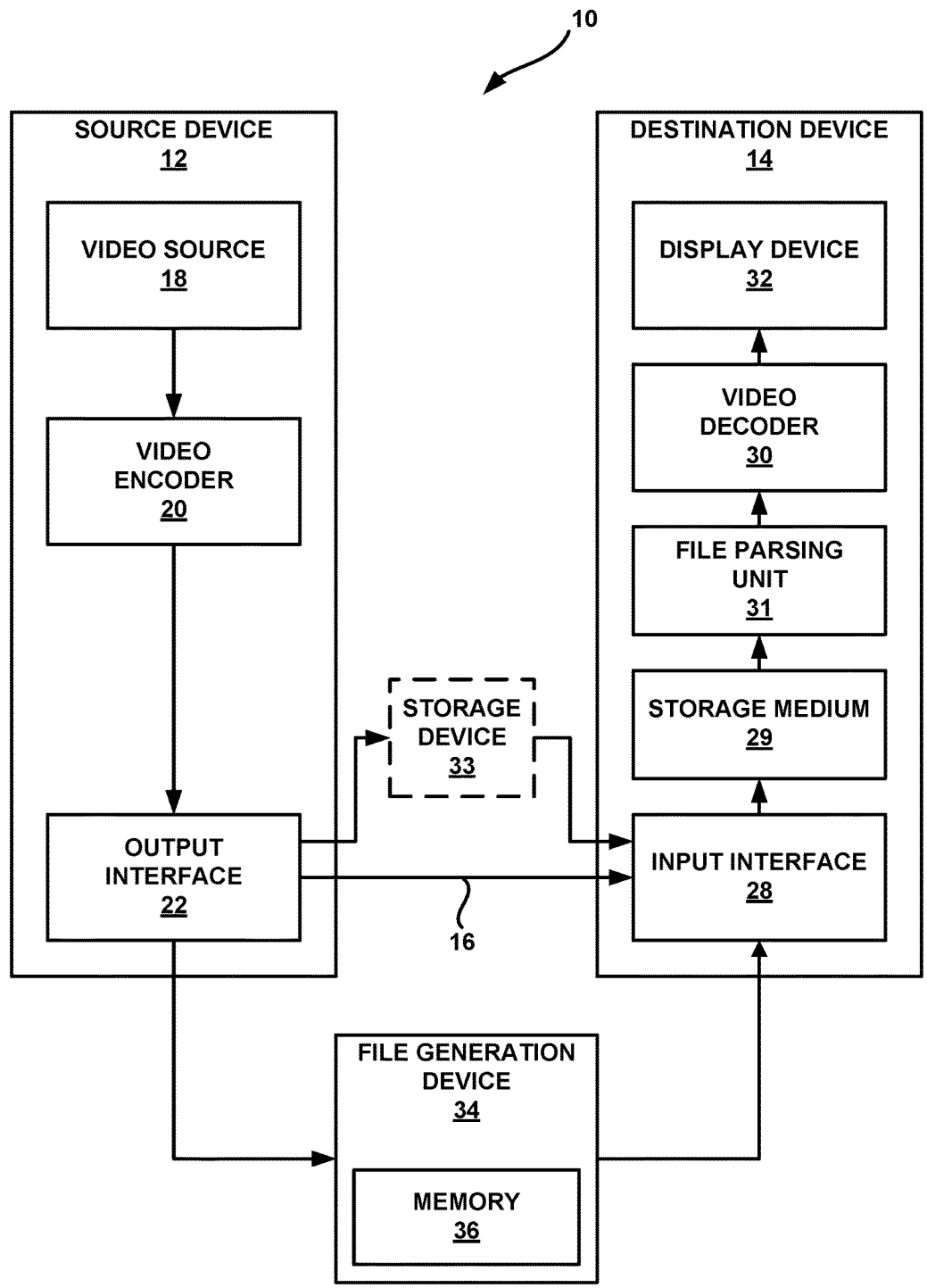
FIG. 1 is a block diagram illustrating an example video encoding and decoding system that may use the techniques described in this disclosure.

The International Standards Organization (ISO) base media file format (ISOBMFF) and file formats derived from the ISO base media file format are designed for storage of video contents. ISOBMFF is defined in terms of a set of nested "boxes" that store encoded video data and associated metadata. For instance, a media data box may include one or more samples. Each of the samples may include encoded video data of one or more pictures in an access unit.

The boxes of an ISOBMFF file include track boxes. Each track box may specify samples belonging to a respective track. For instance, a first track box may specify samples belonging to a first track, a second track box may specify samples belonging to a second track, and so on. Thus, a track of a file may be considered a file-level grouping of samples. For some tracks, devices processing an ISOBMFF file may perform different actions regarding the tracks of the ISOBMFF file without interpreting or decoding the encoded video data stored in the samples of other tracks in the file. For instance, a device may discard the samples of one track while forwarding samples of another track to a video decoder.

The High Efficiency Video Coding (HEVC) and Layered-HEVC (L-HEVC) video coding standards define the concepts of layers and sub-layers. In multi-view coding, pictures in different layers may correspond to pictures in different views. In scalable video coding, pictures in different non-base layers may correspond to pictures containing various types of enhancements, such as signal to noise ratio (SNR) enhancement data, spatial enhancement data, and/or temporal enhancement data. Temporal sub-layer are subsets of pictures within a layer. Temporal sub-layers may be used to provide temporal scalability.

The encoded video data may include end of sequence (EOS) network abstraction layer (NAL) units and end of bitstream (EOB) NAL units. EOS NAL units mark the ends of coded video sequences (CVSs). Thus, a video decoder may determine, based on an EOS NAL unit, that a CVS has ended. In general, a CVS is a sequence of access units. In HEVC, a CVS is sequence of access units that consists, in decoding order, of an IRAP access unit with NoRaslOutputFlag equal to 1, followed by zero or more access units that are not IRAP access units with NoRaslOutputFlag equal to 1, including all subsequent access units up to but not including any subsequent access unit that is an IRAP access unit with NoRaslOutputFlag equal to 1.

EOB NAL units mark the ends of bitstreams. Thus, a video decoder may determine, based on an EOB NAL unit, that a bitstream has ended. A bitstream is a sequence of bits, in the form of a NAL unit stream or a byte stream, that forms the representation of coded pictures and associated data forming one or more CVSs. A NAL unit stream is a sequence of NAL units. A byte stream is an encapsulation of a NAL unit stream containing start code prefixes and NAL units (e.g., as specified in Annex B of HEVC).

Several problems related to EOS NAL units and EOB NAL units may occur when NAL units associated with different temporal sub-layers are in different tracks of a file. For example, if a track containing an EOS NAL unit or an EOB NAL unit is discarded (e.g., because a temporal sub-layer associated with the track is not going to be forwarded or decoded), it may be unclear to a video decoder when a CVS or bitstream ends. Moreover, the bitstream resulting from discarding the track may not conform the requirements of a video coding standard. Video decoders configured to decode bitstreams conforming to the requirements of a video coding standard may be unable to decode bitstreams not conforming to the requirements of the video coding standard.

Techniques of this disclosure may address these issues. For example, in accordance with a technique of this disclosure, a device may generate, in a first track of the file, a first EOS NAL unit for a CVS of a bitstream. In other words, the device may include, in the first track of the file, the first EOS NAL unit of the CVS. The first EOS NAL unit is in a first access unit of the CVS. In this example, the device may generate, in a second track of the file, a second EOS NAL unit for the CVS. In other words, the device may include, in the first track of the file, the second EOS NAL unit of the CVS. The second EOS NAL unit is in a second access unit of the CVS. In this example, the first access unit and the second access unit may belong to different temporal sub-layers. In this way, by allowing multiple EOS NAL units in different tracks, a bitstream generated without one or more of the tracks may still be a conforming bitstream.

In another example, in accordance with a technique of this disclosure, a device may generate, in a first track of the file, a first EOB NAL unit for a CVS of a bitstream. In other words, the device may include, in the first track of the file, the first EOB NAL unit for the CVS. The first EOB NAL unit is in a first access unit of the CVS. In this example, the device may generate, in a second track of the file, a second EOB NAL unit for the CVS of the bitstream. In other words, the device may include, in the second track of the tile, the second EOB NAL unit for the CVS. The second EOB NAL unit is in a second access unit of the CVS. In this way, by allowing multiple EOB NAL units in different tracks, a bitstream generated from the file without one or more of the tracks may still be a conforming bitstream. Thus, the techniques of this disclosure may improve the ability of video decoders to decode bitstreams that were stored in multiple tracks of a file. Additionally, the techniques of this disclosure may accelerate the operation of devices extracting tracks from the file level because such devices may be assured that bitstreams in the tracks have the proper EOS and EOB NAL units without needing to check for and generate EOS and EOB NAL units on the fly.

In this disclosure, ordinal terms such as "first," "second," "third," and so on, are not necessarily indicators of positions within an order, but rather may simply be used to distinguish different instances of the same thing.

FIG. 1 is a block diagram illustrating an example video encoding and decoding system 10 that may use the techniques described in this disclosure. As shown in FIG. 1, system 10 includes a source device 12 that generates encoded video data to be decoded at a later time by a destination device 14. Source device 12 and destination device 14 may comprise any of a wide range of devices, including desktop computers, notebook (i.e., laptop) computers, tablet computers, set-top boxes, telephone handsets such as so-called "smart" phones, so-called "smart" pads, televisions, cameras, display devices, digital media players, video gaming consoles, video streaming device, or the like. In some cases, source device 12 and destination device 14 may be equipped for wireless communication. Hence, source device 12 and destination device 14 may be considered wireless communication devices. Source device 12 and destination device 14 may be considered video devices.

In the example of FIG. 1, source device 12 includes a video source 18, video encoder 20 and an output interface 22. In some cases, output interface 22 may include a modulator/demodulator (modem) and/or a transmitter. Output interface 22 may output the encoded video information to a computer-readable medium 16. Output interface 22 may comprise various types of components or devices. For example, output interface 22 may comprise a wireless transmitter, a modem, a wired networking component (e.g., an Ethernet card), or another physical component. In examples where output interface 22 comprises a wireless transmitter, output interface 22 may be configured to transmit data, such as encoded video data, modulated according to a cellular communication standard, such as 4G, 4G-LTE, LTE Advanced, 5G, and the like. In some examples where output interface 22 comprises a wireless transmitter, output interface 22 may be configured to transmit data, such as encoded video data, modulated according to other wireless standards, such as an IEEE 802.11 specification, an IEEE 802.15 specification (e.g., ZigBee™), a Bluetooth™ standard, and the like. In some examples, circuitry of output interface 22 is integrated into circuitry of video encoder 20 and/or other components of source device 12. For example, video encoder 20 and output interface 22 may be parts of a system on a chip (SoC). The SoC may also include other components, such as a general purpose microprocessor, a graphics processing unit, and so on.

In source device 12, video source 18 may include a source such as a video capture device, e.g., a video camera, a video archive containing previously captured video, a video feed interface to receive video from a video content provider, and/or a computer graphics system for generating computer graphics data as the source video, or a combination of such sources. However, the techniques described in this disclosure may be applicable to video coding in general, and may be applied to wireless and/or wired applications.

Video encoder 20 may encode the captured, pre-captured, or computer-generated video. In some examples, source device 12 transmits the encoded video data directly to destination device 14 via output interface 22 of source device 12. The encoded video data may also (or alternatively) be stored onto storage device 33 for later access by destination device 14 or other devices, for decoding and/or playback.

Destination device 14 includes an input interface 28, a video decoder 30, and a display device 32. Furthermore, in the example of FIG. 1, destination device 14 includes a storage medium 29 and a file parsing unit 31. In some cases, input interface 28 may include a receiver and/or a modem. Input interface 28 of destination device 14 receives the encoded video data over a link 16. The encoded video data communicated over link 16, or provided on storage device 33, may include a variety of syntax elements generated by video encoder 20 for use by a video decoder, such as video decoder 30, in decoding the video data. Such syntax elements may be included with the encoded video data transmitted on a communication medium, stored on a storage medium, or stored on a file server.

Input interface 28 of destination device 14 receives data from computer-readable medium 16. Input interface 28 may comprise various types of components or devices. For example, input interface 28 may comprise a wireless receiver, a modem, a wired networking component (e.g., an Ethernet card), or another physical component. In examples where input interface 28 comprises a wireless receiver, input interface 28 may be configured to receive data, such as the bitstream, modulated according to a cellular communication standard, such as 4G, 4G-LTE, LTE Advanced, 5G, and the like. In some examples where input interface 28 comprises a wireless receiver, input interface 28 may be configured to receive data, such as the bitstream, modulated according to other wireless standards, such as an IEEE 802.11 specification, an IEEE 802.15 specification (e.g., ZigBee™), a Bluetooth™ standard, and the like. In some examples, circuitry of input interface 28 may be integrated into circuitry of video decoder 30 and/or other components of destination device 14. For example, video decoder 30 and input interface 28 may be parts of a SoC. The SoC may also include other components, such as a general purpose microprocessor, a graphics processing unit, and so on.

Display device 32 may be integrated with, or may be external to, destination device 14. In some examples, destination device 14 may include an integrated display device and may also be configured to interface with an external display device. In other examples, destination device 14 may be a display device. In general, display device 32 displays the decoded video data to a user, and may comprise any of a variety of display devices such as a liquid crystal display (LCD), a plasma display, an organic light emitting diode (OLED) display, or another type of display device.

Video encoder 20 and video decoder 30 each may be implemented as any of a variety of suitable encoder or decoder circuitry, as applicable, including fixed function and/or programmable circuitry, such as one or more microprocessors, digital signal processors (DSPs), application specific integrated circuits (ASICs), field programmable gate arrays (FPGAs), discrete logic, software, hardware, firmware or any combinations thereof. When the techniques are implemented partially in software, a device may store instructions for the software in a suitable, non-transitory computer-readable medium and execute the instructions in hardware using one or more processors to perform the techniques of this disclosure. Each of video encoder 20 and video decoder 30 may be included in one or more encoders or decoders, either of which may be integrated as part of a combined encoder/decoder (CODEC) in a respective device.

Destination device 14 may receive the encoded video data to be decoded via link 16. Link 16 may comprise any type of medium or device capable of moving the encoded video data from source device 12 to destination device 14. In one example, link 16 may comprise a communication medium to enable source device 12 to transmit encoded video data directly to destination device 14 in real-time. The encoded video data may be modulated according to a communication standard, such as a wireless communication protocol, and transmitted to destination device 14. The communication medium may comprise any wireless or wired communication medium, such as a radio frequency (RF) spectrum or one or more physical transmission lines. The communication medium may form part of a packet-based network, such as a local area network, a wide-area network, or a global network such as the Internet. The communication medium may include routers, switches, base stations, or any other equipment that may be useful to facilitate communication from source device 12 to destination device 14.

In some examples, output interface 22 outputs encoded data to a storage device 33. Similarly, input interface 28 may access encoded data from storage device 33. Storage device 33 may include any of a variety of distributed or locally accessed data storage media such as a hard drive, Blu-ray discs, DVDs, CD-ROMs, flash memory, volatile or non-volatile memory, or any other suitable digital storage media for storing encoded video data. In a further example, storage device 33 may correspond to a file server or another intermediate storage device that may hold the encoded video generated by source device 12. Destination device 14 may access stored video data from storage device 33 via streaming or download. The file server may be any type of server capable of storing encoded video data and transmitting that encoded video data to the destination device 14. Example file servers include a web server (e.g., for a website), a file transfer protocol (FTP) server, network attached storage (NAS) devices, or a local disk drive. Destination device 14 may access the encoded video data through any standard data connection, including an Internet connection. This may include a wireless channel (e.g., a Wi-Fi connection), a wired connection (e.g., DSL, cable modem, etc.), or a combination of both that is suitable for accessing encoded video data stored on a file server. The transmission of encoded video data from storage device 33 may be a streaming transmission, a download transmission, or a combination of both.

The techniques of this disclosure are not necessarily limited to wireless applications or settings. The techniques may be applied to video coding in support of any of a variety of multimedia applications, such as over-the-air television broadcasts, cable television transmissions, satellite television transmissions, streaming video transmissions, e.g., via the Internet, encoding of digital video data for storage on a data storage medium, decoding of digital video data stored on a data storage medium, or other applications. In some examples, system 10 may be configured to support one-way or two-way video transmission to support applications such as video streaming, video playback, video broadcasting, and/or video telephony.

Furthermore, in the example of FIG. 1, system 10 includes a file generation device 34. File generation device 34 may receive encoded video data generated by source device 12. File generation device 34 may generate a file that includes the encoded video data. Destination device 14 may receive the file generated by file generation device 34. In various examples, file generation device 34 may include various types of computing devices. For instance, file generation device 34 may comprise a video encoding device, a Media Aware Network Element (MANE), a server computing device, a personal computing device, a special-purpose computing device, a commercial computing device, or another type of computing device. In some examples, file generation device 34 is part of a content delivery network. File generation device 34 may receive the encoded video data from source device 12 via a channel such as link 16. Furthermore, destination device 14 may receive the file from file generation device 34 via a channel such as link 16. File generation device 34 may be considered a video device. As shown in the example of FIG. 1, file generation device 34 may comprise a memory 36 configured to store a file that contains encoded video contents.

In other examples, source device 12 or another computing device may generate a file that includes the encoded video data. However, for ease of explanation, this disclosure describes file generation device 34 as generating the file. Nevertheless, it should be understood that such descriptions are applicable to computing devices in general.

In some examples, a MANE, server, or other type of device may comprise a memory configured to store a file generated in accordance with the techniques of this disclosure. This device may process the file, e.g., by obtaining syntax elements from the file, and use the obtained syntax elements for various purposes, such as forwarding particular content within the file to another device, such as destination device 14.

Video encoder 20 and video decoder 30 may operate according to a video compression standard, such as the ITU-T H.265, High Efficiency Video Coding (HEVC), standard or an extension thereof. The HEVC standard may also be referred to as ISO/IEC 23008-2. The design of HEVC has been finalized by the Joint Collaboration Team on Video Coding (JCT-VC) of ITU-T Video Coding Experts Group (VCEG) and ISO/IEC Motion Picture Experts Group (MPEG). Video encoder 20 and video decoder 30 may operate according to one or more of these standards or other standards. Such other video coding standards include ITU-T H.261, ISO/IEC MPEG-1 Visual, ITU-T H.262 or ISO/IEC MPEG-2 Visual, ITU-T H.263, ISO/IEC MPEG-4 Visual, ITU-T H.264 or ISO/IEC MPEG-4 AVC, including its Scalable Video Coding (SVC) and Multiview Video Coding (MVC) extensions. In some examples, video encoder 20 and video decoder 30 operate according to other proprietary or industry standards, such as the ITU-T H.264 standard, alternatively referred to as MPEG-4, Part 10, Advanced Video Coding (AVC), or extensions of such standards. The techniques of this disclosure, however, are not limited to any particular coding standard.

In general, in HEVC, a video frame or picture may be divided into a sequence of treeblocks or largest coding units (LCU) that include both luma and chroma samples. Treeblocks may also be referred to as Coding Tree Units (CTUs). A treeblock has a similar purpose as a macroblock of the H.264/AVC standard. A slice includes a number of consecutive treeblocks in coding order. A video frame or picture may be partitioned into one or more slices. Each treeblock may be split into coding units (CUs) according to a quadtree. For example, a treeblock, as a root node of the quadtree, may be split into four child nodes, and each child node may in turn be a parent node and be split into another four child nodes. A final, unsplit child node, as a leaf node of the quadtree, comprises a coding node, i.e., a coded video block. Syntax data associated with a coded bitstream may define a maximum number of times a treeblock may be split, and may also define a minimum size of the coding nodes.

A CU includes a coding node and prediction units (PUs) and transform units (TUs) associated with the coding node. A size of the CU corresponds to a size of the coding node and must be square in shape. The size of the CU may range from 8×8 pixels up to the size of the treeblock with a maximum of 64×64 pixels or greater. Each CU may contain one or more PUs and one or more TUs. Syntax data associated with a CU may describe, for example, partitioning of the CU into one or more PUs. Partitioning modes may differ between whether the CU is skip or direct mode encoded, intra-prediction mode encoded, or inter-prediction mode encoded. PUs may be partitioned to be non-square in shape. Syntax data associated with a CU may also describe, for example, partitioning of the CU into one or more TUs according to a quadtree. A TU can be square or non-square in shape.

The HEVC standard allows for transformations according to TUs, which may be different for different CUs. The TUs are typically sized based on the size of PUs within a given CU defined for a partitioned LCU, although this may not always be the case. The TUs are typically the same size or smaller than the PUs. In some examples, residual samples corresponding to a CU may be subdivided into smaller units using a quadtree structure known as "residual quad tree" (RQT). The leaf nodes of the RQT may be referred to as TUs. Pixel difference values associated with the TUs may be transformed to produce transform coefficients, which may be quantized.

In general, a PU includes data related to the prediction process. For example, when the PU is intra-mode encoded, the PU may include data describing an intra-prediction mode for the PU. As another example, when the PU is inter-mode encoded, the PU may include data defining a motion vector for the PU. The data defining the motion vector for a PU may describe, for example, a horizontal component of the motion vector, a vertical component of the motion vector, a resolution for the motion vector (e.g., one-quarter pixel precision or one-eighth pixel precision), a reference picture to which the motion vector points, and/or a reference picture list (e.g., List 0, List 1) for the motion vector.

In general, a TU is used for the transform and quantization processes. A given CU having one or more PUs may also include one or more TUs. Following prediction, video encoder 20 may calculate residual values corresponding to the PU. The residual values comprise pixel difference values that may be transformed into transform coefficients, quantized, and scanned using the TUs to produce serialized transform coefficients for entropy coding. This disclosure typically uses the term "video block" to refer to a coding node (i.e., coding block) of a CU. In some specific cases, this disclosure may also use the term "video block" to refer to a treeblock, i.e., LCU, or a CU, which includes a coding node and PUs and TUs.

A video sequence typically includes a series of video frames or pictures. Each slice of a picture may include slice syntax data that describes an encoding mode for the respective slice. Video encoder 20 typically operates on video blocks within individual video slices in order to encode the video data. A video block may correspond to a coding node within a CU. The video blocks may have fixed or varying sizes, and may differ in size according to a specified coding standard.

Following intra-predictive or inter-predictive coding using the PUs of a CU, video encoder 20 may calculate residual data for the TUs of the CU. The PUs may comprise pixel data in the spatial domain (also referred to as the pixel domain) and the TUs may comprise coefficients in the transform domain following application of a transform, e.g., a discrete cosine transform (DCT), an integer transform, a wavelet transform, or a conceptually similar transform to residual video data. The residual data may correspond to pixel differences between pixels of the unencoded picture and prediction values corresponding to the PUs. Video encoder 20 may form the TUs including the residual data for the CU, and then transform the TUs to produce transform coefficients for the CU.

Following any transforms to produce transform coefficients, video encoder 20 may perform quantization of the transform coefficients. Quantization generally refers to a process in which transform coefficients are quantized to possibly reduce the amount of data used to represent the coefficients, providing further compression. The quantization process may reduce the bit depth associated with some or all of the coefficients.

After scanning the quantized transform coefficients to form a one-dimensional vector, video encoder 20 may entropy encode the one-dimensional vector, e.g., according to context adaptive variable length coding (CAVLC), context adaptive binary arithmetic coding (CABAC), syntax-based context-adaptive binary arithmetic coding (SBAC), Probability Interval Partitioning Entropy (PIPE) coding or another entropy encoding methodology. Video encoder 20 may also entropy encode syntax elements associated with the encoded video data for use by video decoder 30 in decoding the video data.

Video encoder 20 may output a bitstream that includes a sequence of bits that forms a representation of coded pictures and associated data. The term "bitstream" may be a collective term used to refer to either a Network Abstraction Layer (NAL) unit stream (e.g., a sequence of NAL units) or a byte stream (e.g., an encapsulation of a NAL unit stream containing start code prefixes and NAL units as specified by Annex B of the HEVC standard). A NAL unit is a syntax structure containing an indication of the type of data in the NAL unit and bytes containing that data in the form of a raw byte sequence payload (RBSP) interspersed as necessary with emulation prevention bits. Each of the NAL units may include a NAL unit header and may encapsulate an RBSP. The NAL unit header may include a syntax element that indicates a NAL unit type code. The NAL unit type code specified by the NAL unit header of a NAL unit indicates the type of the NAL unit. A RBSP may be a syntax structure containing an integer number of bytes that is encapsulated within a NAL unit. In some instances, an RBSP includes zero bits.

Different types of NAL units may encapsulate different types of RBSPs. For example, a first type of NAL unit may encapsulate an RBSP for a picture parameter set (PPS), a second type of NAL unit may encapsulate an RBSP for a slice segment, a third type of NAL unit may encapsulate an RBSP for Supplemental Enhancement Information (SEI), and so on. NAL units that encapsulate RBSPs for video coding data (as opposed to RBSPs for parameter sets and SEI messages) may be referred to as video coding layer (VCL) NAL units. NAL units that contain parameter sets (e.g., video parameter sets (VPSs), sequence parameter sets (SPSs), PPSs, or other types of parameter sets) may be referred to as parameter set NAL units.

This disclosure may refer to a NAL unit that encapsulates an RBSP for a segment slice as a coded slice NAL unit. As defined in HEVC, a slice segment is an integer number of CTUs ordered consecutively in tile scan and contained in a single NAL unit. In contrast, in HEVC, a slice may be an integer number of CTUs contained in one independent slice segment and all subsequent dependent slice segments (if any) that precede the next independent slice segment (if any) within the same access unit. An independent slice segment is a slice segment for which values of the syntax elements of the slice segment header are not inferred from the values for a preceding slice segment. A dependent slice segment is a slice segment for which the values of some syntax elements of the slice segment header are inferred from the values for the preceding independent slice segment in decoding order. The RBSP of a coded slice NAL unit may include a slice segment header and slice data. A slice segment header is a part of a coded slice segment containing the data elements pertaining to the first or all CTUs represented in the slice segment. A slice header is a slice segment header of the independent slice segment that is a current slice segment or the most recent independent slice segment that precedes a current dependent slice segment in decoding order.

Video decoder 30 may receive a bitstream generated by video encoder 20. In addition, video decoder 30 may parse the bitstream to obtain syntax elements from the bitstream. Video decoder 30 may reconstruct the pictures of the video data based at least in part on the syntax elements obtained from the bitstream. The process to reconstruct the video data may be generally reciprocal to the process performed by video encoder 20. For instance, video decoder 30 may use motion vectors of PUs to determine predictive blocks for the PUs of a current CU. In addition, video decoder 30 may inverse quantize coefficient blocks of TUs of the current CU. Video decoder 30 may perform inverse transforms on the coefficient blocks to reconstruct transform blocks of the TUs of the current CU. Video decoder 30 may reconstruct the coding blocks of the current CU by adding the samples of the predictive blocks for PUs of the current CU to corresponding samples of the transform blocks of the TUs of the current CU. By reconstructing the coding blocks for each CU of a picture, video decoder 30 may reconstruct the picture.

As discussed above, video encoder 20 may generate a bitstream that comprises a series of NAL units. In multi-layer video coding, different NAL units of the bitstream may be associated with different layers of the bitstream. A layer may be defined as a set of VCL NAL units and associated non-VCL NAL units that have the same layer identifier. For instance, NAL units may include headers (i.e., NAL unit headers) and payloads (e.g., RBSPs). The NAL unit headers may include layer identifier syntax elements (e.g., nuh_layer_id syntax elements in HEVC). NAL units that have layer identifier syntax elements that specify different values belong to different "layers" of a bitstream. Thus, in multi-layer coding (e.g., MV-HEVC, SVC, or SHVC), the layer identifier syntax element of the NAL unit specifies a layer identifier (i.e., a layer ID) of the NAL unit.

A layer may be equivalent to a view in multi-view video coding. In multi-view video coding, a layer can contain all view components of the same layer, with different time instances. In multi-layer video coding, the term "access unit" may refer to a set of pictures that correspond to the same time instance. For instance, all pictures in an access unit may have the same output time. Thus, a "view component" may be a coded representation of a view in a single access unit.

In some examples, a view component may comprise a texture view component (i.e., a texture picture) or a depth view component (i.e., a depth picture). In some examples of multi-view video coding, a layer contains either coded depth pictures of a specific view or coded texture pictures of a specific view, but not both depth pictures and texture pictures. In other examples of multi-view video coding, a layer contains both texture view components and depth view components of a specific view.

In the context of scalable video coding, a layer typically corresponds to coded pictures having video characteristics different from coded pictures in other layers. Such video characteristics typically include spatial resolution and quality level (e.g., Signal-to-Noise Ratio).

For each respective layer of the bitstream, data in a lower layer may be decoded without reference to data in any higher layer. In scalable video coding, for example, data in a base layer may be decoded without reference to data in an enhancement layer. In general, NAL units may only encapsulate data of a single layer. Thus, NAL units encapsulating data of the highest remaining layer of the bitstream (e.g., a layer associated with a highest layer identifier) may be removed from the bitstream without affecting the decodability of data in the remaining layers of the bitstream. In multi-view coding, higher layers may include additional view components. In scalable video coding, higher layers may include signal to noise ratio (SNR) enhancement data, spatial enhancement data, and/or temporal enhancement data. In multi-layer video coding, a layer may be referred to as a "base layer" if a video decoder can decode pictures in the layer without reference to data of any other layer. In HEVC and other video coding specifications, a layer identifier of a NAL unit is equal to 0 if the NAL unit is in a base layer. If the NAL unit does not relate to a base layer in multi-layer coding, the layer identifier of the NAL unit may have a non-zero value.

In scalable video coding, layers other than the base layer may be referred to as "enhancement layers" and may provide information that enhances the visual quality of video data decoded from the bitstream. Scalable video coding can enhance spatial resolution, signal-to-noise ratio (i.e., quality) or temporal rate.

Multi-layer video coding may support inter-layer prediction. Inter-layer prediction is similar to the inter prediction used in HEVC and other video coding specifications and may use the same syntax elements. However, when a video coder performs inter-layer prediction on a current video unit (such as a PU), the video coder may use, as a reference picture, a picture that is in the same access unit as the current video unit, but in a different layer. In contrast, conventional inter prediction only uses pictures in different access units as reference pictures. When coding a picture in one of the non-base layer, a video coder may add a picture into a reference picture list if the picture is in a different layer but within a same time instance (i.e., access unit) as the picture that the video coder is currently coding.

Furthermore, some pictures within a layer may be decoded without reference to other pictures within the same layer. Thus, NAL units encapsulating data of certain pictures of a layer may be removed from the bitstream without affecting the decodability of other pictures in the layer. Removing NAL units encapsulating data of such pictures may reduce the frame rate of the bitstream. A subset of pictures within a layer that may be decoded without reference to other pictures within the layer may be referred to herein as a "sub-layer," "temporal layer," or a "temporal sub-layer." Thus, temporal scalability may be achieved within one layer by defining a group of pictures with a particular temporal level as a sub-layer (i.e., temporal layer).

NAL units may include temporal identifier (e.g., temporal_id in HEVC) syntax elements. The temporal identifier syntax element of a NAL unit specifies a temporal identifier of the NAL unit. The temporal identifier of a NAL unit identifies a temporal sub-layer with which the NAL unit is associated. Thus, each temporal sub-layer of a layer of a bitstream may be associated with a different temporal identifier. If the temporal identifier of a first NAL unit is less than the temporal identifier of a second NAL unit, the data encapsulated by the first NAL unit may be decoded without reference to the data encapsulated by the second NAL unit.

Figure 2:
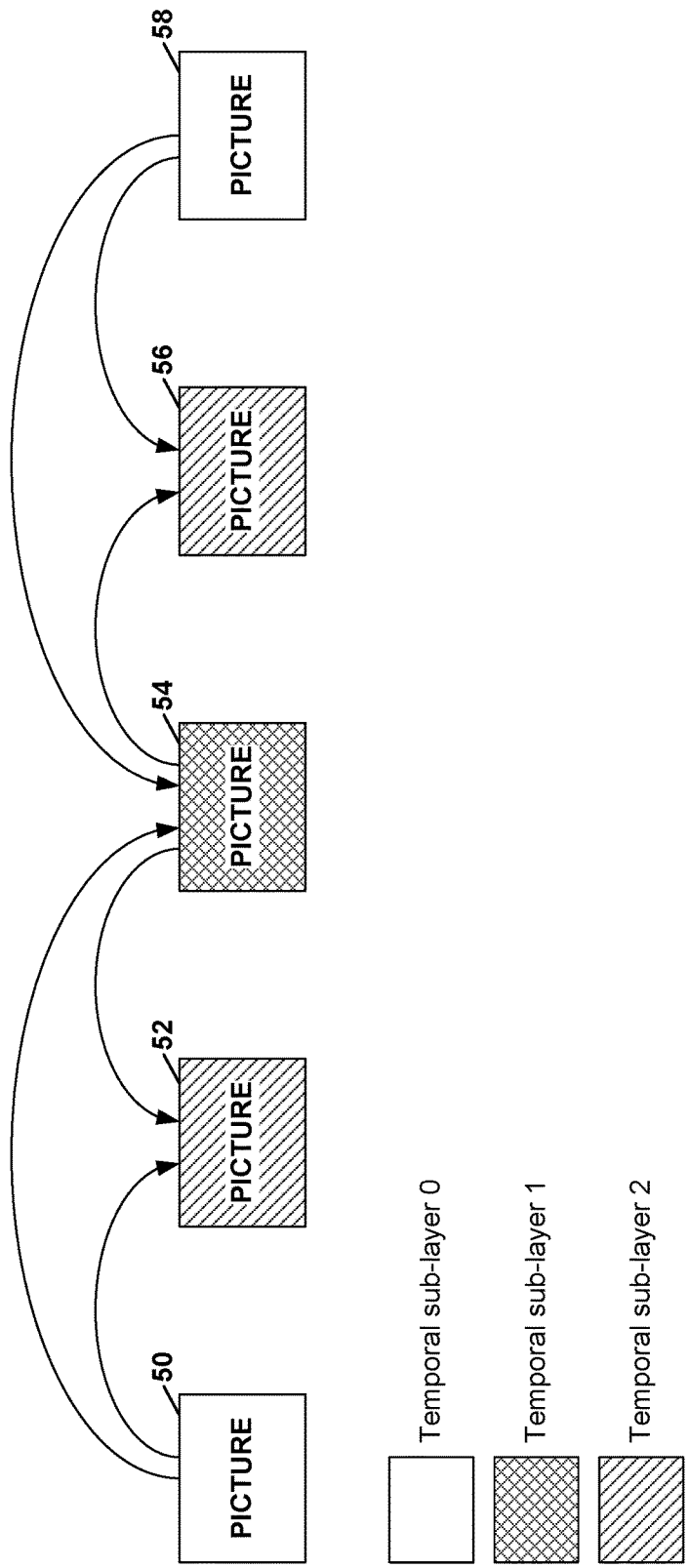
FIG. 2 is a block diagram illustrating example coding dependencies of pictures.

FIG. 2 is a block diagram illustrating example coding dependencies of pictures. In the example of FIG. 2, a CVS includes pictures 50, 52, 54, 56, and 58. Each of pictures 50, 52, 54, 56, and 58 are in respective access units (AUs). The example of FIG. 2 assumes that pictures 50, 52, 54, 56, and 58 are in the same layer. Pictures 50 and 58 are not dependent on any other pictures in the CVS. Picture 54 is dependent on pictures 50 and 58. In other words, picture 54 cannot be decoded without first decoding pictures 50 and 58. For instance, motion parameters of blocks in picture 54 may identify blocks in pictures 50 and 58. Pictures 52 and 56 are dependent on pictures 50, 54, and 58.

For temporal scaling, pictures 52, 54, and 56 can be removed from the bitstream without affecting the ability of video decoder 30 to decode pictures 50 and 58. Hence, pictures 50 and 58 form a first temporal sub-layer (i.e., temporal sub-layer 0). Pictures 52 and 56 can be removed without affecting the ability of video decoder 30 to decode picture 54, but pictures 50 and 58 cannot be removed from the bitstream without affecting the ability of video decoder 30 to decode picture 54. Hence, picture 54 forms a second temporal sub-layer (i.e., temporal sub-layer 1). Pictures 52 and 56 depend on pictures 50, 54, and 58, and hence form a third temporal sub-layer (i.e., temporal sub-layer 2).

As defined in HEVC, a CVS is a sequence of access units (AUs) that consists, in decoding order, of an Intra Random Access Point (IRAP) access unit with NoRaslOutputFlag equal to 1, followed by zero or more access units that are not IRAP access units with NoRaslOutputFlag equal to 1, including all subsequent access units up to but not including any subsequent access unit that is an IRAP access unit with NoRaslOutputFlag equal to 1. An IRAP access unit may be an Instantaneous Decoding Refresh (IDR) access unit, a Broken Link Access (BLA) access unit, or a Clean Random Access (CRA) access unit. The value of NoRaslOutputFlag is equal to 1 for each IDR access unit, each BLA access unit, and each CRA access unit that is the first access unit in the bitstream in decoding order, is the first access unit that follows an end of sequence NAL unit in decoding order, or has HandleCraAsBlaFlag equal to 1.

Furthermore, in HEVC, a CRA picture is an IRAP picture for which each VCL NAL unit has nal_unit_type equal to CRA_NUT. In HEVC, a CRA picture contains only I slices, and may be the first picture in the bitstream in decoding order, or may appear later in the bitstream. A CRA picture may have associated RADL or RASL pictures. When a CRA picture has NoRaslOutputFlag equal to 1, the associated RASL pictures are not output by the decoder, because they may not be decodable, as they may contain references to pictures that are not present in the bitstream. A clean random access (CRA) access unit is an access unit in which the coded picture with nuh_layer_id equal to 0 is a CRA picture.

In HEVC, an IRAP picture is a coded picture for which each VCL NAL unit has nal_unit_type in the range of BLA_W_LP to RSV_IRAP_VCL23, inclusive. An IRAP picture contains only I slices, and may be a BLA picture, a CRA picture or an IDR picture. The first picture in the bitstream in decoding order must be an IRAP picture. Provided the necessary parameter sets are available when they need to be activated, the IRAP picture and all subsequent non-RASL pictures in decoding order can be correctly decoded without performing the decoding process of any pictures that precede the IRAP picture in decoding order. There may be pictures in a bitstream that contain only I slices that are not IRAP pictures. An IRAP access unit is an access unit in which the coded picture with nuh_layer_id equal to 0 is an IRAP picture.

As defined in HEVC, a broken link access (BLA) access unit is an access unit in which the coded picture with nuh_layer_id equal to 0 is a BLA picture. A BLA picture is an IRAP picture for which each VCL NAL unit has nal_unit_type equal to BLA_W_LP, BLA_W_RADL, or BLA_N_LP.

File formats and file format standards are now briefly discussed. File format standards include the ISO base media file format (ISOBMFF, ISO/IEC 14496-12, hereinafter, "ISO/IEC 14996-12"), and other file format standards derived from the ISOBMFF, including MPEG-4 file format (ISO/IEC 14496-15), 3GPP file format (3GPP TS 26.244), and ISO/IEC 14496-15 that contains the file formats for AVC (ISO/IEC 14496-15, hereinafter "ISO/IEC 14996-15") and its extensions as well as the file formats for HEVC and its extensions. ISO/IEC 14496-12 specifies the ISO base media file format. Other documents extend the ISO base media file format for specific applications. For instance, ISO/IEC 14496-15 describes the carriage of NAL unit structured video in the ISO base media file format. H.264/

AVC and HEVC, as well as their extensions, are examples of NAL unit structured video. ISO/IEC 14496-15 includes sections describing the carriage of H.264/AVC NAL units. Additionally, section 8 of ISO/IEC 14496-15 describes the carriage of HEVC NAL units. Thus, section 8 of ISO/IEC 14496-15 is said to describe the HEVC file format. After the 114$^{th}$ MPEG meeting, based on comments received from several national bodies, a disposition document was prepared that contains some changes to the ISO/IEC 14496-15 that will be applied to the new version of the ISO/IEC 14496-15 draft specification. This disposition document is referred to as "MPEG output document N15297."

The ISOBMFF is used as the basis for many codec encapsulation formats, such as the AVC File Format, as well as for many multimedia container formats, such as the MPEG-4 File Format, the 3GPP File Format (3GP), and the DVB File Format. In addition to continuous media, such as audio and video, static media, such as images, as well as metadata, can be stored in a file conforming to the ISOBMFF. Files structured according to the ISOBMFF may be used for many purposes, including local media file playback, progressive downloading of a remote file, segments for Dynamic Adaptive Streaming over HTTP (DASH), containers for content to be streamed and its packetization instructions, and recording of received real-time media streams. Thus, although originally designed for storage, the ISOBMFF has proven valuable for streaming, e.g., for progressive download or DASH. For streaming purposes, movie fragments defined in the ISOBMFF can be used. In addition to continuous media, such as audio and video, a file conforming to the ISOBMFF may also store static media such as images, as well as metadata.

Figure 5:
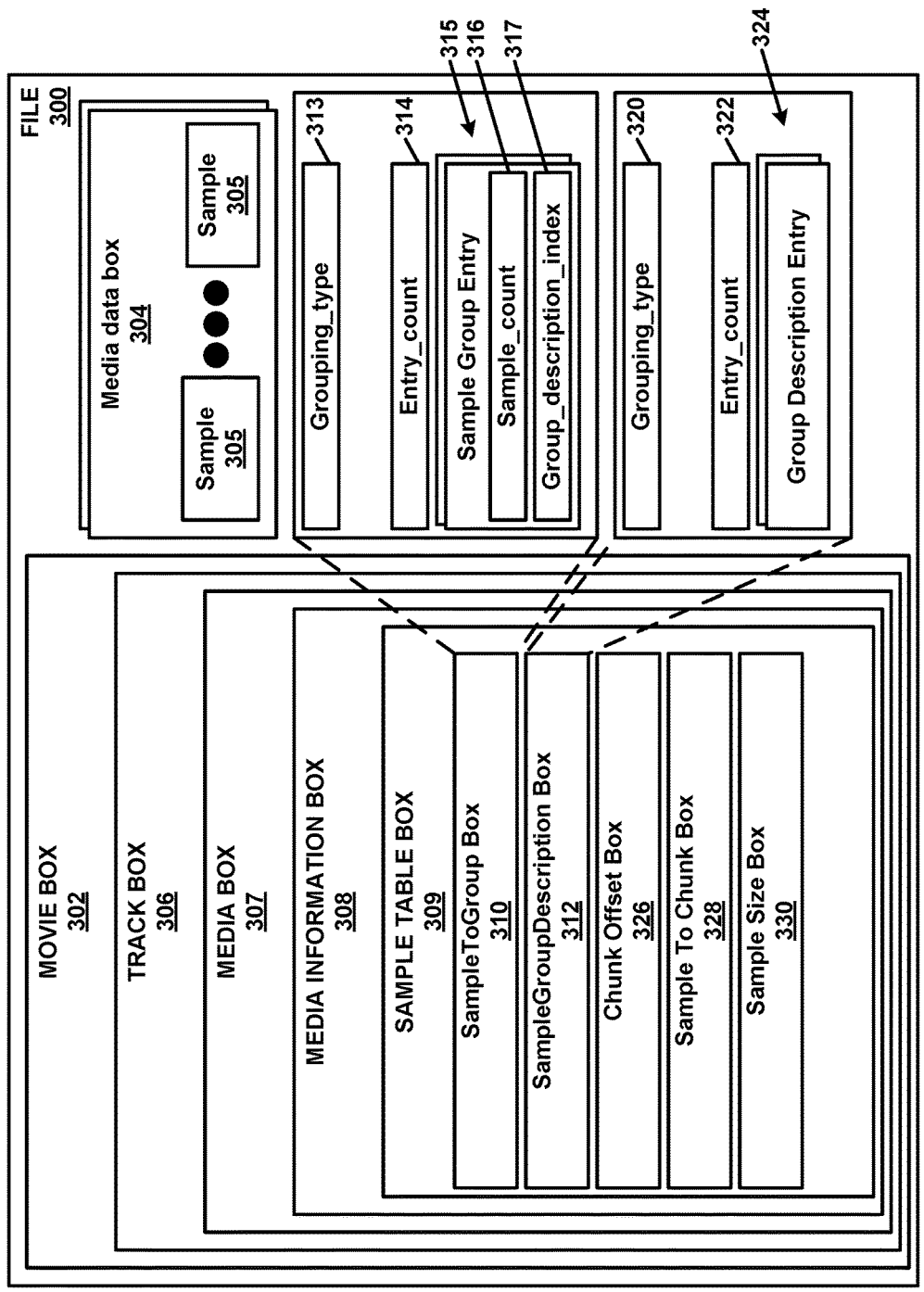
FIG. 5 is a conceptual diagram illustrating an example structure of a file, in accordance with one or more techniques of this disclosure.
Figure 6:
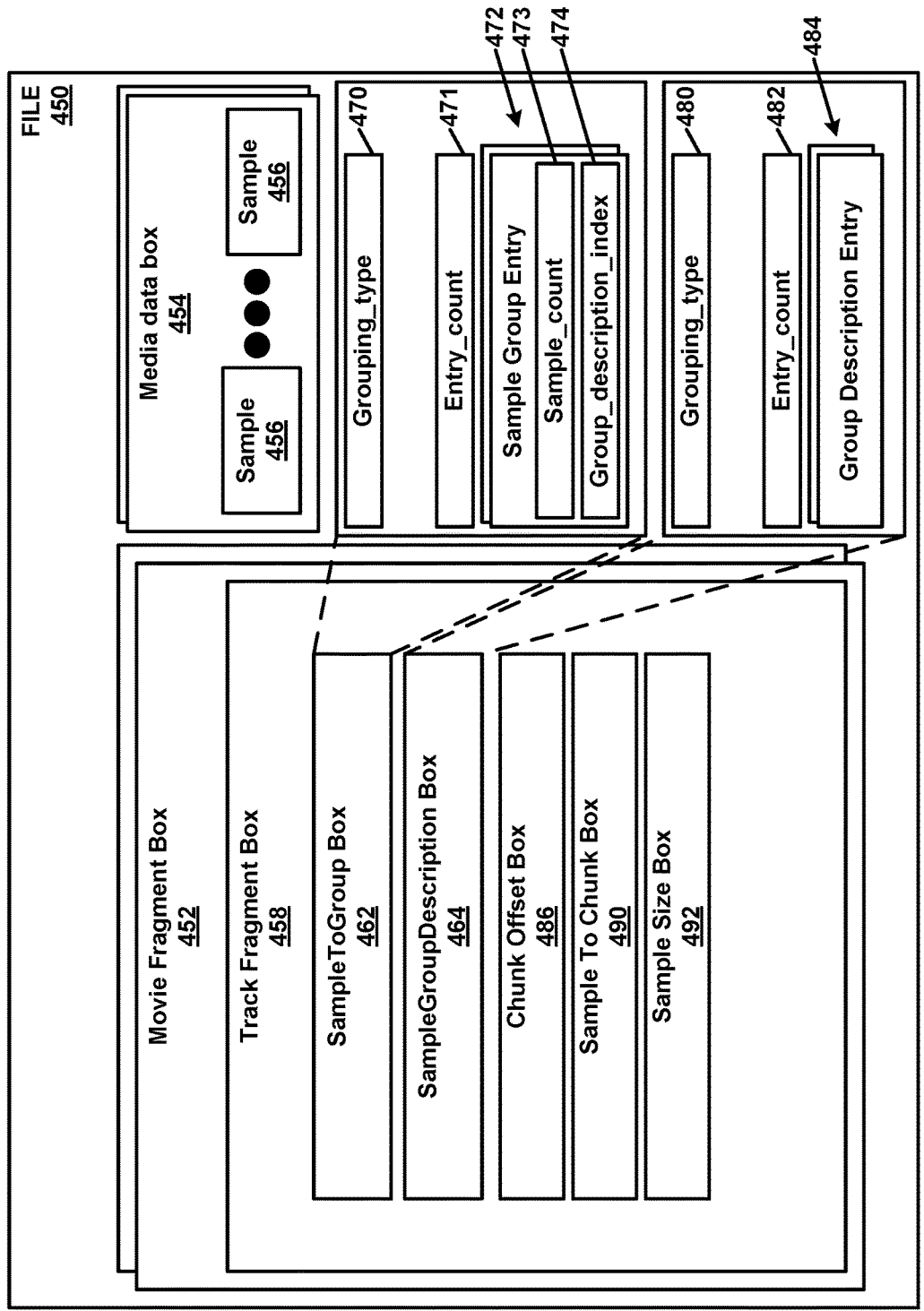
FIG. 6 is a conceptual diagram illustrating an example structure of a file, in accordance with one or more techniques of this disclosure.

A file conforming to the HEVC file format may comprise a series of objects, called boxes. A box may be an object-oriented building block defined by a unique type identifier and length. A box is the elementary syntax structure in the ISOBMFF, including a four-character coded box type, the byte count of the box, and the payload. In other words, a box may be a syntax structure comprising a coded box type, a byte count of the box, and a payload. In some instances, all data in a file conforming to the HEVC file format may be contained within boxes and there may be no data in the file that is not in a box. Thus, an ISOBMFF file may consist of a sequence of boxes, and boxes may contain other boxes. For instance, the payload of a box may include one or more additional boxes. FIG. 5 and FIG. 6, described in detail elsewhere in this disclosure, show example boxes within a file, in accordance with one or more techniques of this disclosure.

A file conforming to the ISOBMFF may include various types of boxes. For example, a file conforming to the ISOBMFF may include a file type box, a media data box, a movie box, a movie fragment box, and so on. In this example, a file type box includes file type and compatibility information. A media data box may contain samples (e.g., coded pictures). A Movie box ("moov") contains metadata for continuous media streams present in the file. Each of the continuous media streams may be represented in the file as a track. For instance, a movie box may contain metadata regarding a movie (e.g., logical and timing relationships between samples, and also pointers to locations of samples). Movie boxes may include several types of sub-boxes. The sub-boxes in a movie box may include one or more track boxes. A track box may include information about an individual track of a movie. A track box may include a track header box that specifies overall information of a single track. In addition, a track box may include a media box that contains a media information box. The media information box may include a sample table box that contains data indexing media samples in the track. Information in the sample table box may be used to locate samples in time and, for each of the samples of the track, a type, size, container, and offset into that container of the sample. Thus, the metadata for a track is enclosed in a Track box ("trak"), while the media content of a track is either enclosed in a Media Data box ("mdat") or directly in a separate file. The media content for tracks comprises or consists of a sequence of samples, such as audio or video access units.

The ISOBMFF specifies the following types of tracks: a media track, which contains an elementary media stream, a hint track, which either includes media transmission instructions or represents a received packet stream, and a timed metadata track, which comprises time-synchronized metadata. The metadata for each track includes a list of sample description entries, each providing the coding or encapsulation format used in the track and the initialization data used for processing that format. Each sample is associated with one of the sample description entries of the track.

The ISOBMFF enables specifying sample-specific metadata with various mechanisms. Specific boxes within the Sample Table box ("stbl") have been standardized to respond to common needs. For example, a Sync Sample box ("stss") is used to list the random access samples of the track. The sample grouping mechanism enables mapping of samples according to a four-character grouping type into groups of samples sharing the same property specified as a sample group description entry in the file. Several grouping types have been specified in the ISOBMFF. The Sample Table box contains a sample table that contains all the time and data indexing of the media samples in a track. Using the tables in the Sample Table box, it may be possible to locate samples in time, determine their type (e.g. I-frame or not), and determine their size, container, and offset into that container.

For example, a Sync Sample box ("stss") is a box within a Sample Table box. The Sync Sample box is used to list the random access samples of the track. This disclosure may refer to a sample listed by the Sync Sample box as a sync sample. In another example, a sample grouping mechanism enables mapping of samples according to a four-character grouping type into groups of samples sharing the same property specified as a sample group description entry in the file. Several grouping types have been specified in the ISOBMFF.

The ISOBMFF specification specifies six types of Stream Access Points (SAPs) for use with DASH. The first two SAP types (types 1 and 2) correspond to IDR pictures in H.264/AVC and HEVC. The third SAP type (type 3) corresponds to open-GOP random access points hence BLA or CRA pictures in HEVC. The fourth SAP type (type 4) corresponds to GDR random access points.

A Movie Fragment box is a top-level box. Each Movie Fragment box provides information that would have previously been in the Movie box. A Movie Fragment box may contain one or more track fragment ("traf") boxes. Within the Movie Fragment there is a set of track fragments, zero or more per track. The track fragments in turn contain zero or more track runs, each of which documents a contiguous run of samples for that track. For instance, each track run may contain samples of pictures that are contiguous in a certain order, such as decoding order. A track fragment box is defined in the 14996-12 specification and comprises metadata for one or more track fragments. For instance, a track fragment box may include a track fragment header box indicating a track ID, a base data offset, a sample description index, a default sample duration, a default sample size, and default sample flags. A track fragment box may include one or more track fragment run boxes, each documenting a contiguous set of samples for a track. For instance, a track fragment box may include syntax elements indicating a sample count, a data offset, sample flags, a sample duration, a sample size, sample composition time offset, and so on. Within these structures, many fields are optional and can be defaulted.

A sample table box may include one or more SampleToGroup boxes and one or more sample group description boxes (i.e., SampleGroupDescription boxes). A SampleToGroup box may be used to determine a sample group to which a sample belongs, along with an associated description of the sample group. In other words, a SampleToGroup box may indicate a group to which a sample belongs. A SampleToGroup box may have a box type of "sbgp." A SampleToGroup box may include a grouping type element (e.g., grouping_type). In some instances, in this disclosure, an element of a box may also be referred to as a syntax element. The grouping type element may be an integer that identifies a type (i.e., a criterion used to form the sample groups) of a sample grouping. Furthermore, a SampleToGroup box may include one or more entries (i.e., sample group entries). Each sample group entry in a SampleToGroup box may be associated with a different, non-overlapping series of consecutive samples in the track. Each sample group entry may indicate a sample count element (e.g., sample_count) and a group description index element (e.g., group_description_index). The sample count element of a sample group entry may indicate a number of samples associated with the sample group entry. In other words, the sample count element of the sample group entry may be an integer that gives the number of consecutive samples with the same sample group descriptor. The group description index element may identify, within a SampleGroupDescription box, a group description entry that contains a description of the samples associated with the sample group entry. The group description index elements of multiple sample group entries may identify the same SampleGroupDescription box.

In ISO/IEC 23008-2 (i.e., the specification for HEVC and its multi-layer extensions), it is constrained that, when an EOB NAL unit is present in an access unit (AU), it shall be the last NAL unit in the AU, and when an EOS NAL unit is present in an AU, it shall precede all NAL units except the EOS NAL unit, if present, in the AU.

In the file formats for HEVC and its extensions as specified in clauses 8 and 9 of ISO/IEC 14496-15, the so-called layered HEVC (L-HEVC) file format in clause 9 specifies the storage of video bitstreams of the multi-layer extensions of HEVC. According to the L-HEVC file format, temporal sub-layers (also simply called sub-layers) of an HEVC or L-HEVC bitstream may be stored in more than one track.

However, the current design of storing sub-layers of an HEVC or L-HEVC bitstream has one or more issues. For example, for AUs that are within the CVS of an HEVC or L-HEVC bitstream and that belong to different sub-layers stored in multiple tracks, if an EOB NAL unit is only allowed to be included in one or more AUs containing pictures with the highest TemporalId, the EOB NAL unit may be lost when that track is not used. This can be a problem if the next AU in the reconstructed bitstream contains a clean random access (CRA) picture, as the presence of an EOB NAL unit immediately preceding a CRA picture in a bitstream would require a different decoding process for that CRA picture than when such an EOB NAL unit is not present, and consequently, a wrong decoding result may be incurred, which can disrupt user experience.

On the other hand, for AUs that are within the same CVS of an HEVC or L-HEVC bitstream and that belong to different sub-layers stored in multiple tracks, if an EOB NAL unit is only allowed to be included in one or more AUs containing pictures with the lowest TemporalId and/or one or more of other TemporalId less than the highest TemporalId, a reordering process is always needed to ensure that in the bitstream reconstruction process the EOB NAL unit is placed at the end of the last AU of the CVS in the reconstructed bitstream; otherwise the reconstructed bitstream is not conforming. Furthermore, in this case if the base layer is coded by a codec other than HEVC (e.g., AVC), the EOB NAL unit needs to be discarded and a new EOB NAL unit (i.e., HEVC EOB NAL unit) may need to be generated. Similar problems as above may apply for EOS NAL units.

To address the issues mentioned above, the techniques described below are proposed. Some of the aspects may be applied independently and some of the techniques may be applied in combination. Although the techniques are described in the context of HEVC and layered HEVC, the techniques may apply to other codecs with temporal scalability support, such as AVC and its layered extensions.

In accordance with a first example technique of this disclosure, for AUs that are within the same CVS of an HEVC or L-HEVC bitstream and that belong to different sub-layers stored in multiple tracks, an EOS NAL unit is allowed to be present in more than one of the tracks (e.g., in each of the tracks), as part of the last AU that is within the same CVS in such a track. In accordance with a second example technique of this disclosure, for AUs that are within the same CVS of an HEVC or L-HEVC bitstream and that belong to different sub-layers stored in multiple tracks, when more than one of the tracks contains an EOS NAL unit in the respective samples, only one of the EOS NAL units shall be kept in the last of these access units (the one with the greatest decoding time) in the final reconstructed bitstream, placed after all NAL units, except the EOB NAL unit (when present), of the last of these access units, and other EOS NAL units are discarded.

For example, a file may include a first track and a second track. In this example, the first track may include a first temporal sub-layer of a layer of bitstream and the second track may include a second temporal sub-layer of the same layer of the bitstream. Furthermore, in this example, the first track may include a first EOS NAL unit and the second track may include a second EOS NAL unit. In this example, in accordance with the second example technique of this disclosure, when a device (e.g., file parsing unit 31) extracts from the file a bitstream that includes the first and second temporal sub-layers, the device may include in the bitstream whichever of the first EOS NAL unit or the second EOS NAL unit is in the later access unit and may discard the other EOS NAL unit. However, in instances where the device extracts from the file a bitstream that includes only one of the first or second temporal sub-layers, the device may include each NAL unit of the included temporal sub-layer (including any EOS NAL units of the included temporal sub-layer) and none of the NAL units of the other temporal sub-layer (including any EOS NAL units of the other temporal sub-layer).

Thus, in some examples, a device, such as file generation device 34 or source device 12, may include, in a first track of a file for storage of video contents, a first EOS NAL unit for a CVS of a bitstream (e.g., an HEVC bitstream). In this example, the first EOS NAL unit is in a first access unit of the CVS. Furthermore, in this example, the device may include, in a second track of the file, a second EOS NAL unit for the CVS. In this example, the second EOS NAL unit is in a second access unit of the CVS. In this example, the second EOS NAL unit is different from the first EOS NAL unit. The first access unit and the second access unit may belong to different temporal sub-layers. In some instances of this example, the first track may include a first set of access units of the bitstream for the CVS and the first access unit is a last access unit in order of the first set of access units. Furthermore, in some instances of this example, the second track includes a second set of access units of the bitstream for the CVS and the second access unit is a last access unit in order of the second set of access units.

In another example, a device, such as destination device 14 (e.g., file parsing unit 31 of destination device 14), may receive a file comprising a first track and a second track. In this example, the first track includes a first access unit of a CVS of a bitstream (e.g., an HEVC bitstream). The second track includes a second access unit of the CVS. In this example, the first access unit includes a first EOS NAL unit and the second access unit includes a second EOS NAL unit. The first access unit and the second access unit belong to different temporal sub-layers. The file may include tracks in addition to the first and second tracks and the bitstream may include additional layers and temporal sub-layers. In this example, the device may output, based on a comparison of a time associated with the first EOS NAL unit and a time associated with the second EOS NAL unit, the first EOS NAL unit and may discard the second EOS NAL unit. Thus, a bitstream reconstructed from the file may include the first EOS NAL unit, but not the second EOS NAL unit. In some examples, the device compares a decoding time associated with the first access unit and a decoding time associated with the second access unit. The device may keep whichever of the first EOS NAL unit and the second EOS NAL unit is in the access unit associated with the later decoding time and may discard the other EOS NAL unit. For instance, based on the first access unit being associated with a later decoding time than the second access unit, the device may keep the first EOS NAL unit and discard the second EOS NAL unit. Thus, in this example, the final reconstructed bitstream may include the first EOS NAL unit at a position after all NAL units, except an EOB NAL unit if present, of a last access unit in order of the CVS.

In some instances of this example, the first track includes a first set of access units of the bitstream for the CVS, and the first access unit is a last access unit in order of the first set of access units. Furthermore, in such instances, the second track includes a second set of access units of the bitstream for the CVS, and the second access unit is a last access unit in order of the second set of access units. In some instances of this example, the device (e.g., file parsing unit 31) may output NAL units of the CVS in the first track to video decoder 30. Additionally, the device (e.g., file parsing unit 31) may output NAL units of the CVS in the second track to video decoder 30. Video decoder 30 may decode, based on the NAL units of the CVS in at least one of the first or second tracks, pictures of the CVS.

In some examples, the device may determine, based on the first access unit including the first EOS NAL unit, that there are no subsequent NAL units of the CVS stored in the first track. In this example, the device may determine, based on the second access unit including the second EOS NAL unit, that there are no subsequent NAL units of the CVS stored in the second track.

In accordance with a third example technique of this disclosure, for AUs that are within the same CVS of an HEVC or L-HEVC bitstream and that belong to different sub-layers stored in multiple tracks, an EOB NAL unit is allowed to be present in more than one of the track (e.g., in each of the tracks), as part of the last AU that is within the same CVS in such a track. For example, a file may include a first track and a second track. In this example, the first track may include a first temporal sub-layer of a layer of bitstream and the second track may include a second temporal sub-layer of the same layer of the bitstream. Furthermore, in this example, in accordance with the third example technique of this disclosure, the first track may include a first EOB NAL unit and the second track may include a second EOB NAL unit.

In accordance with a fourth example technique of this disclosure, for AUs that are within the same CVS of an HEVC or L-HEVC bitstream and that belong to different sub-layers stored in multiple tracks, when more than one of the tracks contains an EOB NAL unit in the respective samples, only one of the EOB NAL units shall be kept in the final reconstructed bitstream, placed at the end of the last of these access units, and other EOB NAL units are discarded. For example, a file may include a first track and a second track. In this example, the first track may include a first temporal sub-layer of a layer of bitstream and the second track may include a second temporal sub-layer of the same layer of the bitstream. The file may include tracks in addition to the first and second tracks and the bitstream may include additional layers and temporal sub-layers. Furthermore, in this example, the first track may include a first EOB NAL unit and the second track may include a second EOB NAL unit. In this example, in accordance with the fourth example technique of this disclosure, when a device (e.g., file parsing unit 31) extracts from the file a bitstream that includes the first and second temporal sub-layers, the device may include in the bitstream whichever of the first EOB NAL unit or the second EOB NAL unit is in the later access unit and discard the other EOB NAL unit. However, in instances where the device extracts from the file a bitstream that includes only one of the first or second temporal sub-layers, the device may include each NAL unit of the included temporal sub-layer (including any EOB NAL units of the included temporal sub-layer) and none of the NAL units of the other temporal sub-layer (including any EOB NAL units of the other temporal sub-layer).

In one example, a device, such as file generation device 34 or source device 12, may include, in a first track of a file for storage of video contents, a first EOB NAL unit for a CVS of a bitstream (e.g., an HEVC bitstream). In this example, the first EOB NAL unit is in a first access unit of the CVS. Furthermore, in this example, the device may include, in a second track of the file, a second EOB NAL unit for the CVS. In this example, the second EOB NAL unit is in a second access unit of the CVS. In this example, the second EOB NAL unit is different from the first EOB NAL unit. In this example, the first access unit and the second access unit belong to different temporal sub-layers. In some instances of this example, the first track includes a first set of access units of the bitstream, the first access unit is a last access unit in order of the first set of access units, the second track includes a second set of access units of the bitstream, and the second access unit is a last access unit in order of the second set of access units.

In another example, a device, such as destination device 14 (e.g., file parsing unit 31 of destination device 14), receives a file comprising a first track and a second track. In this example, the first track includes a first access unit of a CVS of a bitstream (e.g., an HEVC bitstream). The second track includes a second access unit of the CVS. In this example, the first access unit includes a first EOB NAL unit and the second access unit includes a second EOB NAL unit, the first access unit and the second access unit belong to different temporal sub-layers, and the device outputs the first EOB NAL unit and discards the second EOB NAL unit. The device may include the first EOB NAL unit at a position after all NAL units of a last access unit of the CVS. In some examples, the device may compare a decoding time associated with the first access unit and a decoding time associated with the second access unit. In such examples, the device may keep whichever of the first EOB NAL unit and the second EOB NAL unit is in the access unit associated with the later decoding time and discard the other EOB NAL unit. For instance, based on the first access unit being associated with a later decoding time than the second access unit, the device may keep the first EOB NAL unit and discard the second EOB NAL unit.

In some instances of this example, the device (e.g., file parsing unit 31) may output NAL units of the CVS in the first track to video decoder 30. Additionally, the device (e.g., file parsing unit 31) may output NAL units of the CVS in the second track to video decoder 30. Video decoder 30 may decode, based on the NAL units of the CVS in at least one of the first or second tracks, pictures of the CVS.

Figure 3:
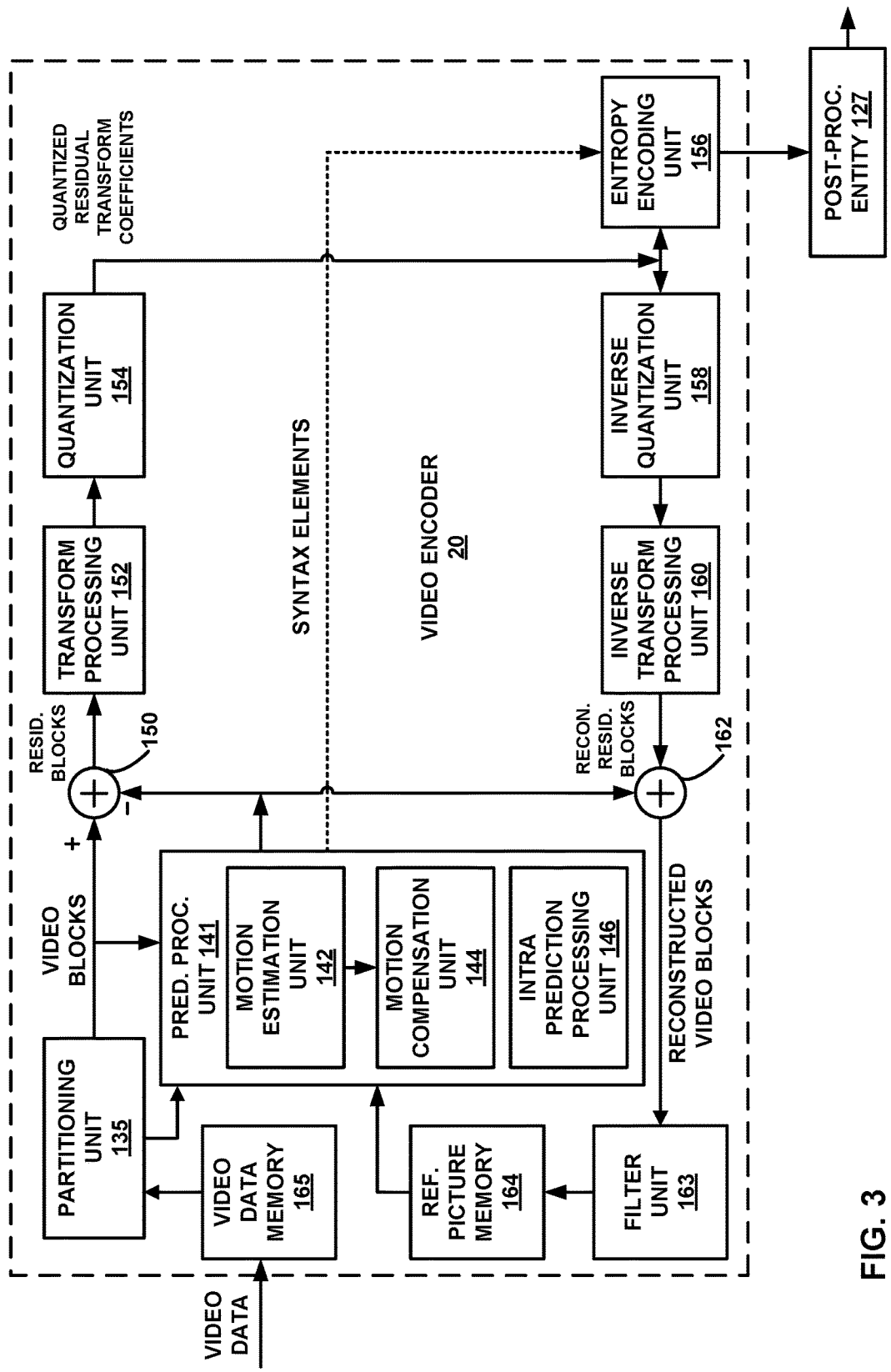
FIG. 3 is a block diagram illustrating an example video encoder that may implement the techniques described in this disclosure.

FIG. 3 is a block diagram illustrating an example video encoder 20 that may implement the techniques described in this disclosure. Video encoder 20 represents an example of a video coder configured generate video data that may be stored using the file format techniques described in this disclosure. Video encoder 20 may be configured to output single view, multiview, scalable, 3D, and other types of video data. Video encoder 20 may be configured to output video to post-processing entity 127. Post-processing entity 127 is intended to represent an example of a video entity, such as a MANE or splicing/editing device, that may process encoded video data from video encoder 20. In some instances, post-processing entity 127 may be an example of a network entity. In some video encoding systems, post-processing entity 127 and video encoder 20 may be parts of separate devices, while in other instances, the functionality described with respect to post-processing entity 127 may be performed by the same device that comprises video encoder 20. Post-processing entity 127 may be a video device. In some examples, post-processing entity 127 may be the same as file generation device 34 of FIG. 1.

Processing circuitry includes video encoder 20, and video encoder 20 is configured to perform one or more of the example techniques described in this disclosure. For instance, video encoder 20 includes integrated circuitry, and the various units illustrated in FIG. 3 may be formed as hardware circuit blocks that are interconnected with a circuit bus. These hardware circuit blocks may be separate circuit blocks or two or more of the units may be combined into a common hardware circuit block. The hardware circuit blocks may be formed as combination of electric components that form operation blocks such as arithmetic logic units (ALUs), elementary function units (EFUs), as well as logic blocks such as AND, OR, NAND, NOR, XOR, XNOR, and other similar logic blocks.

In some examples, one or more of the units illustrated in FIG. 3 may be software units executing on the processing circuitry. In such examples, the object code for these software units is stored in memory. An operating system may cause video encoder 20 to retrieve the object code and execute the object code, which causes video encoder 20 to perform operations to implement the example techniques. In some examples, the software units may be firmware that video encoder 20 executes at startup. Accordingly, video encoder 20 is a structural component having hardware that performs the example techniques or has software/firmware executing on the hardware to specialize the hardware to perform the example techniques.

Video encoder 20 may perform intra- and inter-coding of video blocks within video slices. Intra-coding relies on spatial prediction to reduce or remove spatial redundancy in video within a given video frame or picture. Inter-coding relies on temporal prediction to reduce or remove temporal redundancy in video within adjacent frames or pictures of a video sequence. Intra-mode (I mode) may refer to any of several spatial based compression modes. Inter-modes, such as uni-directional prediction (P mode) or bi-prediction (B mode), may refer to any of several temporal-based compression modes.

In the example of FIG. 3, video encoder 20 includes a partitioning unit 135, a prediction processing unit 141, a filter unit 163, a reference picture memory 164, a summer 150, a transform processing unit 152, a quantization unit 154, and an entropy encoding unit 156. Prediction processing unit 141 includes a motion estimation unit 142, a motion compensation unit 144, and an intra prediction processing unit 146. For video block reconstruction, video encoder 20 also includes an inverse quantization unit 158, an inverse transform processing unit 160, and a summer 162. Filter unit 163 is intended to represent one or more loop filters such as a deblocking filter, an adaptive loop filter (ALF), and a sample adaptive offset (SAO) filter. Although filter unit 163 is shown in FIG. 3 as being an in-loop filter, in other configurations, filter unit 163 may be implemented as a post loop filter.

A video data memory 165 of video encoder 20 may store video data to be encoded by the components of video encoder 20. The video data stored in video data memory 165 may be obtained, for example, from video source 18. Reference picture memory 164 may be a reference picture memory that stores reference video data for use in encoding video data by video encoder 20, e.g., in intra- or inter-coding modes. Video data memory 165 and reference picture memory 164 may be formed by any of a variety of memory devices, such as dynamic random access memory (DRAM), including synchronous DRAM (SDRAM), magnetoresistive RAM (MRAM), resistive RAM (RRAM), or other types of memory devices. Video data memory 165 and reference picture memory 164 may be provided by the same memory device or separate memory devices. In various examples, video data memory 165 may be on-chip with other components of video encoder 20, or off-chip relative to those components.

As shown in FIG. 3, video encoder 20 receives video data, and partitioning unit 135 partitions the data into video blocks. This partitioning may also include partitioning into slices, or other larger units, as wells as video block partitioning, e.g., according to a quadtree structure of LCUs and CUs. Video encoder 20 generally illustrates the components that encode video blocks within a video slice to be encoded.

The slice may be divided into multiple video blocks. Prediction processing unit 141 may select one of a plurality of possible coding modes, such as one of a plurality of intra coding modes or one of a plurality of inter coding modes, for the current video block based on error results (e.g., coding rate and the level of distortion). Prediction processing unit 141 may provide the resulting intra- or inter-coded block to summer 150 to generate residual block data and to summer 162 to reconstruct the encoded block for use as a reference picture.

Intra prediction processing unit 146 within prediction processing unit 141 may perform intra-predictive coding of the current video block relative to one or more neighboring blocks in the same frame or slice as the current block to be coded to provide spatial compression. Motion estimation unit 142 and motion compensation unit 144 within prediction processing unit 141 perform inter-predictive coding of the current video block relative to one or more predictive blocks in one or more reference pictures to provide temporal compression.

Motion estimation unit 142 may be configured to determine the inter-prediction mode for a video slice according to a predetermined pattern for a video sequence. The predetermined pattern may designate video slices in the sequence as P slices, B slices, or GPB slices. Motion estimation unit 142 and motion compensation unit 144 may be highly integrated, but are illustrated separately for conceptual purposes. Motion estimation, performed by motion estimation unit 142, is the process of generating motion vectors, which estimate motion for video blocks. A motion vector, for example, may indicate the displacement of a PU of a video block within a current video frame or picture relative to a predictive block within a reference picture.

A predictive block is a block that is found to closely match the PU of the video block to be coded in terms of pixel difference, which may be determined by sum of absolute difference (SAD), sum of square difference (SSD), or other difference metrics. In some examples, video encoder 20 may calculate values for sub-integer pixel positions of reference pictures stored in reference picture memory 164. For example, video encoder 20 may interpolate values of one-quarter pixel positions, one-eighth pixel positions, or other fractional pixel positions of the reference picture. Therefore, motion estimation unit 142 may perform a motion search relative to the full pixel positions and fractional pixel positions and output a motion vector with fractional pixel precision.

Motion estimation unit 142 calculates a motion vector for a PU of a video block in an inter-coded slice by comparing the position of the PU to the position of a predictive block of a reference picture. The reference picture may be selected from a first reference picture list (List 0) or a second reference picture list (List 1), each of which identify one or more reference pictures stored in reference picture memory 164. Motion estimation unit 142 sends syntax elements from which the calculated motion vector can be determined to entropy encoding unit 156 and motion compensation unit 144.

Motion compensation, performed by motion compensation unit 144, may involve fetching or generating the predictive block based on the motion vector determined by motion estimation, possibly performing interpolations to sub-pixel precision. Upon receiving the motion vector for the PU of the current video block, motion compensation unit 144 may locate the predictive block to which the motion vector points in one of the reference picture lists. Video encoder 20 may form a residual video block by subtracting pixel values of the predictive block from the pixel values of the current video block being coded, forming pixel difference values. The pixel difference values form residual data for the block, and may include both luma and chroma difference components. Summer 150 represents the component or components that perform this subtraction operation. Motion compensation unit 144 may also generate syntax elements associated with the video blocks and the video slice for use by video decoder 30 in decoding the video blocks of the video slice.

Intra prediction processing unit 146 may intra-predict a current block, as an alternative to the inter-prediction performed by motion estimation unit 142 and motion compensation unit 144, as described above. In particular, intra prediction processing unit 146 may determine an intra-prediction mode to use to encode a current block. In some examples, intra prediction processing unit 146 may encode a current block using various intra-prediction modes, e.g., during separate encoding passes, and intra prediction processing unit 146 may select an appropriate intra-prediction mode to use from the tested modes. For example, intra prediction processing unit 146 may calculate rate-distortion values using a rate-distortion analysis for the various tested intra-prediction modes, and select the intra-prediction mode having the best rate-distortion characteristics among the tested modes. Rate-distortion analysis generally determines an amount of distortion (or error) between an encoded block and an original, unencoded block that was encoded to produce the encoded block, as well as a bit rate (that is, a number of bits) used to produce the encoded block. Intra prediction processing unit 146 may calculate ratios from the distortions and rates for the various encoded blocks to determine which intra-prediction mode exhibits the best rate-distortion value for the block.

In any case, after selecting an intra-prediction mode for a block, intra prediction processing unit 146 may provide information indicative of the selected intra-prediction mode for the block to entropy encoding unit 156. Entropy encoding unit 156 may encode the information indicating the selected intra-prediction mode in accordance with the techniques of this disclosure. Video encoder 20 may include in the transmitted bitstream configuration data, which may include a plurality of intra-prediction mode index tables and a plurality of modified intra-prediction mode index tables (also referred to as codeword mapping tables), definitions of encoding contexts for various blocks, and indications of a most probable intra-prediction mode, an intra-prediction mode index table, and a modified intra-prediction mode index table to use for each of the contexts.

After prediction processing unit 141 generates the predictive block for the current video block via either inter-prediction or intra-prediction, video encoder 20 may form a residual video block by subtracting the predictive block from the current video block. The residual video data in the residual block may be included in one or more TUs and applied to transform processing unit 152. Transform processing unit 152 transforms the residual video data into residual transform coefficients using a transform, such as a discrete cosine transform (DCT) or a conceptually similar transform. Transform processing unit 152 may convert the residual video data from a pixel domain to a transform domain, such as a frequency domain.

Transform processing unit 152 may send the resulting transform coefficients to quantization unit 154. Quantization unit 154 quantizes the transform coefficients to further reduce bit rate. The quantization process may reduce the bit depth associated with some or all of the coefficients. The degree of quantization may be modified by adjusting a quantization parameter. In some examples, quantization unit 154 may then perform a scan of the matrix including the quantized transform coefficients. Alternatively, entropy encoding unit 156 may perform the scan.

Following quantization, entropy encoding unit 156 may entropy encode syntax elements representing the quantized transform coefficients. For example, entropy encoding unit 156 may perform context adaptive variable length coding (CAVLC), context adaptive binary arithmetic coding (CABAC), syntax-based context-adaptive binary arithmetic coding (SBAC), probability interval partitioning entropy (PIPE) coding or another entropy encoding methodology or technique. Following the entropy encoding by entropy encoding unit 156, the encoded bitstream may be transmitted to video decoder 30, or archived for later transmission or retrieval by video decoder 30. Entropy encoding unit 156 may also entropy encode the motion vectors and the other syntax elements for the current video slice being coded.

Inverse quantization unit 158 and inverse transform processing unit 160 apply inverse quantization and inverse transformation, respectively, to reconstruct the residual block in the pixel domain for later use as a reference block of a reference picture. Motion compensation unit 144 may calculate a reference block by adding the residual block to a predictive block of one of the reference pictures within one of the reference picture lists. Motion compensation unit 144 may also apply one or more interpolation filters to the reconstructed residual block to calculate sub-integer pixel values for use in motion estimation. Summer 162 may add the reconstructed residual block to the motion compensated prediction block produced by motion compensation unit 144 to produce a reference block for storage in reference picture memory 164. The reference block may be used by motion estimation unit 142 and motion compensation unit 144 as a reference block to inter-predict a block in a subsequent video frame or picture.

In accordance with a technique of this disclosure, post-processing entity 127 may generate a file for storage of encoded video content generated by video encoder 20. Post-processing entity 127 may generate the file in accordance with any of the techniques of this disclosure. For example, post-processing entity 127 may include, in a first track of the file, a first EOS NAL unit for a CVS of a bitstream and may include, in a second track of the file, a second EOS NAL unit for the CVS. In some example, post-processing entity 127 may include, in a first track of the file, a first EOB NAL unit for a CVS of a bitstream and may include, in a second track of the file, a second EOB NAL unit for the CVS of the bitstream.

Figure 4:
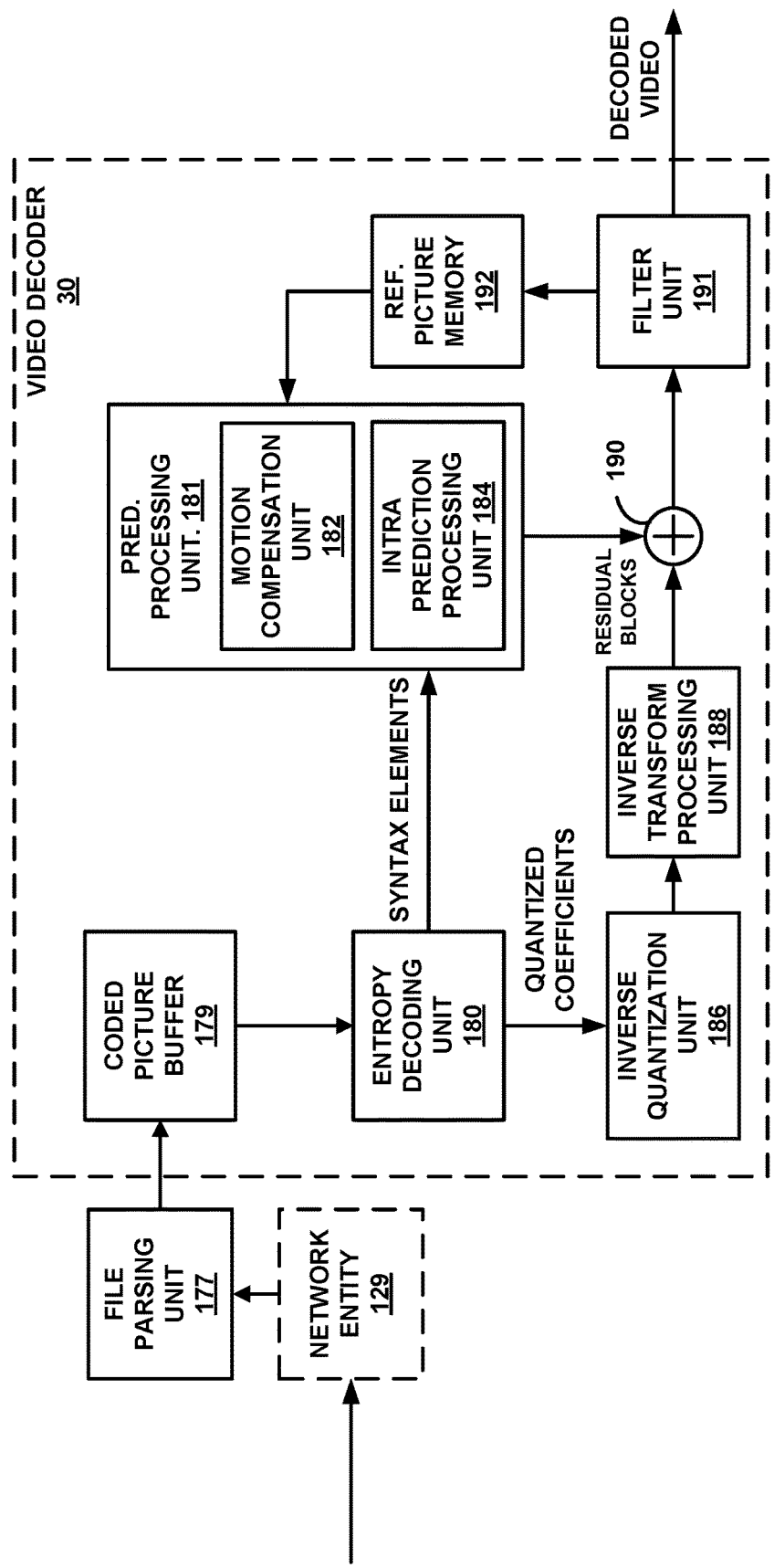
FIG. 4 is a block diagram illustrating an example video decoder that may implement the techniques described in this disclosure.

FIG. 4 is a block diagram illustrating an example video decoder 30 that may implement the techniques described in this disclosure. Video decoder 30 of FIG. 4 represents an example of a video decoder configured to decode video data that may be stored using the file format techniques described in this disclosure.

Processing circuitry includes video decoder 30, and video decoder 30 is configured to perform one or more of the example techniques described in this disclosure. For instance, video decoder 30 includes integrated circuitry, and the various units illustrated in FIG. 4 may be formed as hardware circuit blocks that are interconnected with a circuit bus. These hardware circuit blocks may be separate circuit blocks or two or more of the units may be combined into a common hardware circuit block. The hardware circuit blocks may be formed as combination of electric components that form operation blocks such as arithmetic logic units (ALUs), elementary function units (EFUs), as well as logic blocks such as AND, OR, NAND, NOR, XOR, XNOR, and other similar logic blocks.

In some examples, one or more of the units illustrated in FIG. 4 may be software units executing on the processing circuitry. In such examples, the object code for these software units is stored in memory. An operating system may cause video decoder 30 to retrieve the object code and execute the object code, which causes video decoder 30 to perform operations to implement the example techniques. In some examples, the software units may be firmware that video decoder 30 executes at startup. Accordingly, video decoder 30 is a structural component having hardware that performs the example techniques or has software/firmware executing on the hardware to specialize the hardware to perform the example techniques.

Video decoder 30 may be configured to decode single view, multiview, scalable, 3D, and other types of video data. In the example of FIG. 4, video decoder 30 includes an entropy decoding unit 180, a prediction processing unit 181, an inverse quantization unit 186, an inverse transform processing unit 188, a summer 190, a filter unit 191, and a reference picture memory 192. Prediction processing unit 181 includes a motion compensation unit 182 and an intra prediction processing unit 184. Video decoder 30 may, in some examples, perform a decoding pass generally reciprocal to the encoding pass described with respect to video encoder 20 from FIG. 3.

A coded picture buffer (CPB) 179 may receive and store encoded video data (e.g., NAL units) of a bitstream. The video data stored in CPB 179 may be obtained, for example, from link 16 of FIG. 1, e.g., from a local video source, such as a camera, via wired or wireless network communication of video data, or by accessing physical data storage media. CPB 179 may form a video data memory that stores encoded video data from an encoded video bitstream. Reference picture memory 192 may be a reference picture memory that stores reference video data for use in decoding video data by video decoder 30, e.g., in intra- or inter-coding modes. CPB 179 and reference picture memory 192 may be formed by any of a variety of memory devices, such as dynamic random access memory (DRAM), including synchronous DRAM (SDRAM), magnetoresistive RAM (MRAM), resistive RAM (RRAM), or other types of memory devices. CPB 179 and reference picture memory 192 may be provided by the same memory device or separate memory devices. In various examples, CPB 179 may be on-chip with other components of video decoder 30, or off-chip relative to those components.

During the decoding process, video decoder 30 receives an encoded video bitstream that represents video blocks of an encoded video slice and associated syntax elements from video encoder 20. In the example of FIG. 4, video decoder 30 may receive the encoded video bitstream from a file parsing unit 177 that parses a file to extract a coded video bitstream. In some examples, file parsing unit 177 may receive the file from a network entity 129. Network entity 129 may, for example, be a server, a MANE, a video editor/splicer, or other such device configured to implement one or more of the techniques described above. Network entity 129 may or may not include a video encoder, such as video encoder 20. Some of the techniques described in this disclosure may be implemented by network entity 129 prior to network entity 129 transmitting the encoded video bitstream to video decoder 30. In some video decoding systems, network entity 129 and video decoder 30 may be parts of separate devices, while in other instances, the functionality described with respect to network entity 129 may be performed by the same device that comprises video decoder 30. Network entity 129 may be considered to be a video device.

Furthermore, in some examples, network entity 129 is the file generation device 34 of FIG. 1. File parsing unit 177 may be implemented as part of destination device 14 or a device separate from destination device. In some examples, network entity 129 and file parsing unit 177 are implemented by the same device. File parsing unit 177 may implement various techniques of this disclosure. For example, file parsing unit 177 may receive a file comprising a first track and a second track. In this example, the first track includes a first access unit of a CVS of a bitstream and the second track includes a second access unit of the CVS. The first access unit may include a first EOS NAL unit and the second access unit may include a second EOS NAL unit. In some examples, as part of extracting a final bitstream from the file, file parsing unit 177 may output, in the final bitstream, whichever of the first EOS NAL unit or the second EOS NAL unit is associated with a later decoding time. For instance, based on a comparison of a decoding time associated with the first EOS NAL unit and a decoding time associated with the second EOS NAL unit revealing the decoding time associated with the first EOS NAL unit is later, file parsing unit 177 may output (e.g., include in the final bitstream) the first EOS NAL unit and may discard the second EOS NAL unit. File parsing unit 177 may output NAL units of the CVS in the first track to video decoder 30 and may output NAL units of the CVS in the second track to video decoder 30.

In another example, file parsing unit 177 may receive a file comprising a first track and a second track. In this example, the first track includes a first access unit of a CVS of a bitstream and the second track includes a second access unit of the CVS. The first access unit may include a first EOB NAL unit and the second access unit may include a second EOB NAL unit. In some examples, as part of extracting a final bitstream from the file, file parsing unit 177 may output, in the final bitstream, the first EOB NAL unit and may discard the second EOB NAL unit. In this example, file parsing unit 177 may include NAL units of both the first track and the second track in the final bitstream. For instance, file parsing unit 177 may output NAL units of the CVS in the first track to video decoder 30 and may output NAL units of the CVS in the second track to video decoder 30. In some examples, file parsing unit 177 may output whichever of the first EOB NAL unit or the second EOB NAL unit is associated with a later time. For instance, based on a comparison of a time associated with the first EOB NAL unit and a time associated with the second EOB NAL unit revealing the time associated with the first EOB NAL unit is later, file parsing unit 177 may output the first EOB NAL unit and may discard the second EOB NAL unit, or vice versa.

Entropy decoding unit 180 of video decoder 30 entropy decodes particular syntax elements of the bitstream to generate quantized coefficients, motion vectors, and other syntax elements. Entropy decoding unit 180 forwards the motion vectors and other syntax elements to prediction processing unit 181. Video decoder 30 may receive the syntax elements at the video slice level and/or the video block level.

When the video slice is coded as an intra-coded (I) slice, intra prediction processing unit 184 of prediction processing unit 181 may generate prediction data for a video block of the current video slice based on a signaled intra prediction mode and data from previously decoded blocks of the current frame or picture. When the video frame is coded as an inter-coded (i.e., B or P) slice, motion compensation unit 182 of prediction processing unit 181 produces predictive blocks for a video block of the current video slice based on the motion vectors and other syntax elements received from entropy decoding unit 180. The predictive blocks may be produced from one of the reference pictures within one of the reference picture lists. Video decoder 30 may construct the reference frame lists, List 0 and List 1, using default construction techniques based on reference pictures stored in reference picture memory 192.

Motion compensation unit 182 determines prediction information for a video block of the current video slice by determining the motion vectors and obtaining other syntax elements, and uses the prediction information to produce the predictive blocks for the current video block being decoded. For example, motion compensation unit 182 uses some of the received syntax elements to determine a prediction mode (e.g., intra- or inter-prediction) used to code the video blocks of the video slice, an inter-prediction slice type (e.g., B slice, or P slice), construction information for one or more of the reference picture lists for the slice, motion vectors for each inter-encoded video block of the slice, inter-prediction status for each inter-coded video block of the slice, and other information to decode the video blocks in the current video slice.

Motion compensation unit 182 may also perform interpolation based on interpolation filters. Motion compensation unit 182 may use interpolation filters as used by video encoder 20 during encoding of the video blocks to calculate interpolated values for sub-integer pixels of reference blocks. In this case, motion compensation unit 182 may determine the interpolation filters used by video encoder 20 from the received syntax elements and may use the interpolation filters to produce predictive blocks.

Inverse quantization unit 186 inverse quantizes, i.e., dequantizes, the quantized transform coefficients provided in the bitstream and decoded by entropy decoding unit 180. The inverse quantization process may include use of a quantization parameter calculated by video encoder 20 for each video block in the video slice to determine a degree of quantization and, likewise, a degree of inverse quantization that should be applied. Inverse transform processing unit 188 applies an inverse transform, e.g., an inverse DCT, an inverse integer transform, or a conceptually similar inverse transform process, to the transform coefficients in order to produce residual blocks in the pixel domain.

After motion compensation unit 182 generates the predictive block for the current video block based on the motion vectors and other syntax elements, video decoder 30 forms a decoded video block by summing the residual blocks from inverse transform processing unit 188 with the corresponding predictive blocks generated by motion compensation unit 182. Summer 190 represents the component or components that perform this summation operation. If desired, loop filters (either in the coding loop or after the coding loop) may also be used to smooth pixel transitions, or otherwise improve the video quality. Filter unit 191 is intended to represent one or more loop filters such as a deblocking filter, an adaptive loop filter (ALF), and a sample adaptive offset (SAO) filter. Although filter unit 191 is shown in FIG. 4 as being an in-loop filter, in other configurations, filter unit 191 may be implemented as a post loop filter. The decoded video blocks in a given frame or picture are then stored in reference picture memory 192, which stores reference pictures used for subsequent motion compensation. Reference picture memory 192 also stores decoded video data for later presentation on a display device, such as display device 32 of FIG. 1. Thus, reference picture memory 192 may be an example of one or more data storage media configured to store video data.

FIG. 5 is a conceptual diagram illustrating examples structure of a file 300, in accordance with one or more techniques of this disclosure. In the example of FIG. 5, file 300 includes a movie box 302 and a plurality of media data boxes 304. Although illustrated in the example of FIG. 5 as being in the same file, in other examples, movie box 302 and media data boxes 304 may be in separate files. As indicated above, a box may be an object-oriented building block defined by a unique type identifier and length. For instance, a box may be the elementary syntax structure in the ISOB-MFF, including a four-character coded box type, a byte count of the box, and a payload.

Movie box 302 may contain metadata for tracks of file 300. Each track of file 300 may comprise a continuous stream of media data. Each of media data boxes 304 may include one or more samples 305. Each of samples 305 may comprise an audio or video access unit. As described elsewhere in this disclosure, each access unit may comprise multiple coded pictures in multi-view coding (e.g., MV-HEVC and 3D-HEVC) and scalable video coding (e.g., SHVC). For instance, an access unit may include one or more coded pictures for each layer.

Furthermore, in the example of FIG. 5, movie box 302 includes a track box 306. Track box 306 may enclose metadata for a track of file 300. In other examples, movie box 302 may include multiple track boxes for different tracks of file 300. Track box 306 includes a media box 307. Media box 307 may contain all objects that declare information about the media data within the track. Media box 307 includes a media information box 308. Media information box 308 may contain all objects that declare characteristic information of the media of the track. Media information box 308 includes a sample table box 309. Sample table box 309 may specify sample-specific metadata.

In the example of FIG. 5, sample table box 309 includes at least one SampleToGroup box 310 and at least one SampleGroupDescription box 312. Thus, sample table box 309 is an instance of a "container box." In other examples, sample table box 309 may include other boxes in addition to SampleToGroup box 310 and SampleGroupDescription box 312, and/or may include multiple SampleToGroup boxes and SampleGroupDescription boxes. SampleToGroup box 310 may map samples (e.g., particular ones of samples 305) to a group of samples. SampleGroupDescription Box 312 may specify a property shared by the samples in the group of samples (i.e., sample group).

Furthermore, in the example of FIG. 5, SampleToGroup box 310 includes a grouping_type syntax element 313 (i.e., a grouping type syntax element), an entry_count syntax element 314 (i.e., an entry count syntax element), and one or more sample group entries 315. Entry count syntax element 314 indicates the number of sample group entries 315. Each of sample group entries 315 includes a sample_count syntax element 316 (i.e., a sample count syntax element) and a group_description_index syntax element 317 (i.e., a group description index syntax element). Sample_count syntax element 316 may indicate a number of samples associated with the sample group entry containing sample_count syntax element 316. Group_description_index syntax element 317 may identify, within a SampleGroupDescription box (e.g., SampleGroupDescription box 312), a group description entry that contains a description of the samples associated with the sample group entry containing group_description-_index syntax element 317.

Additionally, in the example of FIG. 5, SampleGroupDescription box 312 includes a grouping_type syntax element 320, an entry_count syntax element 322, and one or more group description entries 324. Entry_count syntax element 322 indicates the number of group description entries 324 in the SampleGroupDescription box.

Furthermore, in the example of FIG. 5, sample table box 308 includes a chunk offset box 326, a sample to chunk box 328, and a sample size box 330. Samples are clustered in a file in "chunks." Each of the chunks may be a consecutive series of bits in the file. Chunk offset box 326 includes data specifying starting locations and/or offsets of chunks containing samples of the track. In this way, the file may associate samples, and NAL units in the samples, with tracks. Different track boxes include different chunk offset boxes. Thus, for each respective track, a device may determine based on the chunk offset boxes of the respective track, which chunks of the file include samples for the respective track. As described in § 8.7.4 of ISOBMFF 14496-12, a device may use data in sample to chunk box 328 to construct a table indicating which may include data usable to find a chunk that contains a sample of the track, a position of the sample, and an associated sample description. As described in § 8.7.3 of ISOBMFF 14496-12, sample size box 330 may specify sizes of samples in the track.

In the example of FIG. 5, track box 306 (i.e., a first track box) may contain metadata regarding a first track. Additionally, file 300 may include a second track box (not shown in the example of FIG. 5 for the sake of visual simplicity) having a structure similar to that of track box 306. The second track box may contain metadata regarding a second track. In accordance with one or more techniques of this disclosure, a sample in a media data box of the first track may include an EOS NAL unit for a CVS and a sample in a media data box of the second track may include an EOS NAL unit for the same CVS. Moreover, in accordance with one or more techniques of this disclosure, a sample in a media data box of the first track may include an EOB NAL unit for a CVS and a sample in a media data box of the second track may include an EOB NAL unit for the same CVS.

FIG. 6 is a conceptual diagram illustrating an example structure of a file 450, in accordance with one or more techniques of this disclosure. In the examples of FIG. 6, file 450 includes one or more Movie Fragment boxes 452 and a plurality of media data boxes 454. Although illustrated in the example of FIG. 6 as being in the same file, in other examples movie fragment boxes 452 and media data boxes 454 may be in separate files. Each of media data boxes 454 may include one or more samples 456. Some or all of samples 456 may comprise a respective picture of the video contents. Each of the movie fragment boxes corresponds to a movie fragment. Each movie fragment may comprise a set of track fragments. There may be zero or more track fragments per track.

In the example of FIG. 6, a movie fragment box 452 provides information regarding a corresponding movie fragment. Such information would have previously been in a movie box, such as movie box 302. Movie fragment box 452 may include a track fragment box 458. Track fragment box 458 corresponds to a track fragment and provides information about the track fragment.

For instance, in the example of FIG. 6, track fragment box 458 may include one or more SampleToGroup boxes 462 and one or more SampleGroupDescription boxes 464 that contain information about the track fragment corresponding to track fragment box 458. Thus, track fragment box 458 is an instance of a "container box."

Furthermore, in the example of FIG. 6, SampleToGroup box 462 includes a grouping_type syntax element 470 (i.e., a grouping type syntax element), an entry_count syntax element 471 (i.e., an entry count syntax element), and one or more sample group entries 472. Entry_count syntax element 471 indicates the number of sample group entries 472. Each of sample group entries 472 includes a sample_count syntax element 473 (i.e., a sample count syntax element) and a group_description_index syntax element 474 (i.e., a group description index syntax element). Sample_count syntax element 473 may indicate a number of samples associated with the sample group entry containing sample_count syntax element 473. Group_description_index syntax element 474 may identify, within a SampleGroupDescription box (e.g., SampleGroupDescription box 464), a group description entry that contains a description of the samples associated with the sample group entry containing group_description_index syntax element 474.

Additionally, in the example of FIG. 6, SampleGroupDescription box 464 includes a grouping_type syntax element 480, an entry count syntax element 482, and one or more group description entries 484. Entry_count syntax element 482 indicates the number of group description entries 484 in SampleGroupDescription box 464.

In the example of FIG. 6, track fragment box 458 also includes a chunk offset box 486, a sample to chunk box 490, and a sample size box 492. Chunk offset box 486, sample to chunk box 490, and sample size box 492 may have the same syntax and semantics as chunk offset box 326, sample to chunk box 328, and sample size box 330 of FIG. 5.

In the example of FIG. 6, track fragment box 458 (i.e., a first track box) may contain metadata regarding a segment of a first track. Additionally, file 300 may include a second track fragment box (i.e., a second track box, which is not shown in the example of FIG. 6 for the sake of visual simplicity) having a structure similar to that of track fragment box 458. The second track fragment box may contain metadata regarding a segment of a second track. In accordance with one or more techniques of this disclosure, a sample in a media data box of the segment of the first track may include an EOS NAL unit for a CVS and a sample in a media data box of the segment of the second track may include an EOS NAL unit for the same CVS. Moreover, in accordance with one or more techniques of this disclosure, a sample in a media data box of the first track may include an EOB NAL unit for a CVS and a sample in a media data box of the second track may include an EOB NAL unit for the same CVS.

Figure 7:
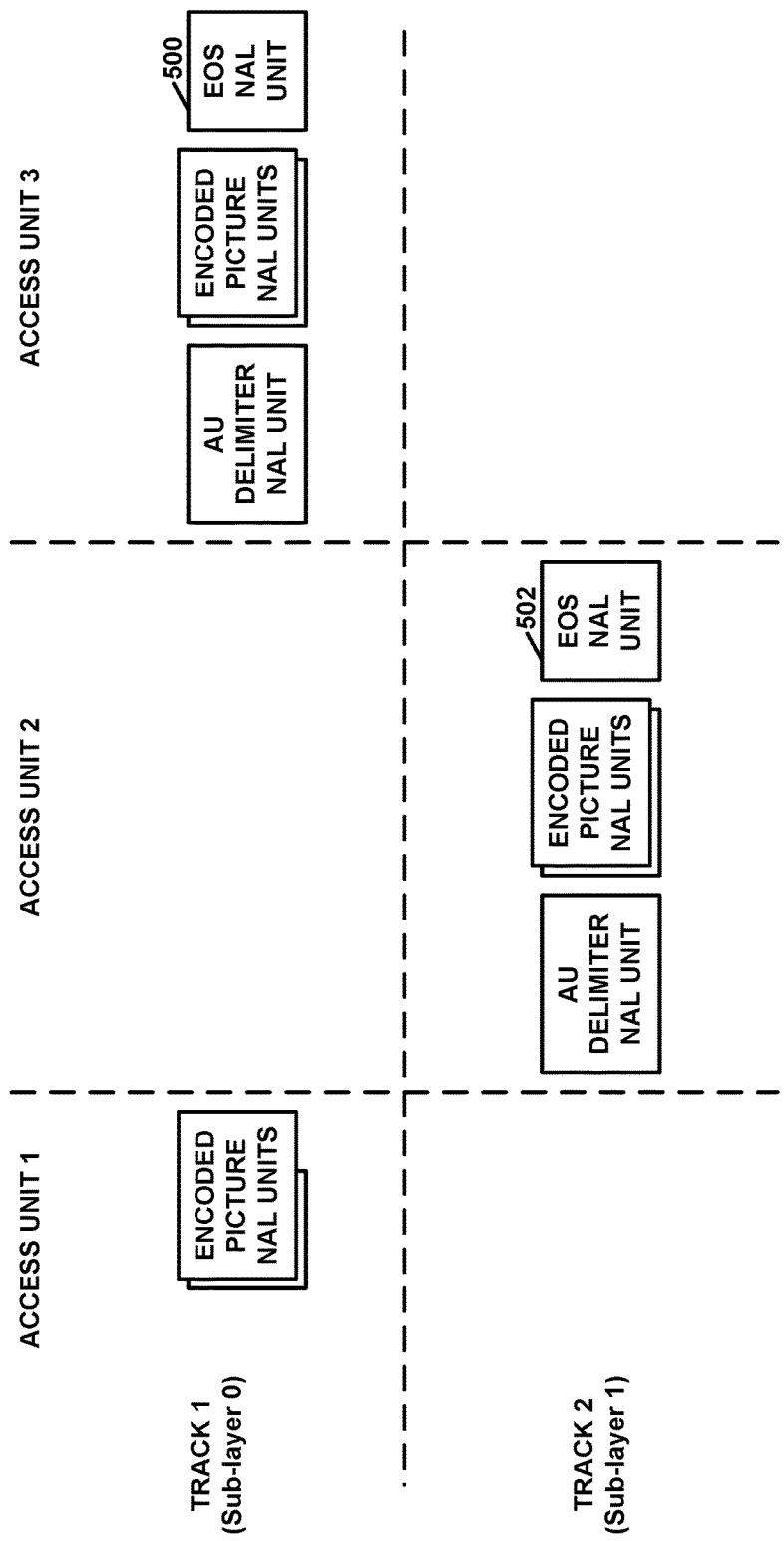
FIG. 7 is a conceptual diagram illustrating an example of End of Sequence (EOS) Network Abstraction Layer (NAL) units in multiple tracks of a file, in accordance with one or more techniques of this disclosure.

FIG. 7 is a conceptual diagram illustrating an example of EOS NAL units in multiple tracks of a file, in accordance with one or more techniques of this disclosure. In the example of FIG. 7, the file includes two tracks: Track 1 and Track 2. Furthermore, in the example of FIG. 7, track 1 contains NAL units of a first sub-layer (i.e., sub-layer 0) and track 2 contains NAL units of a second sub-layer (i.e., sub-layer 1). The portions of sub-layer 0 and sub-layer 1 shown in the example of FIG. 7 belong to the same CVS.

In accordance with one or more techniques of this disclosure, EOS NAL units are present in more than one of the tracks of the file (i.e., Track 1 and Track 2). Furthermore, in accordance with one or more techniques of this disclosure, for each respective track, the EOS NAL unit in the respective track is part of the last AU that is within the CVS. For instance, EOS NAL unit 500 is in the last AU of track 1 that is in the CVS and EOS NAL unit 502 is in the last AU of track 2 that is the CVS.

Figure 8:
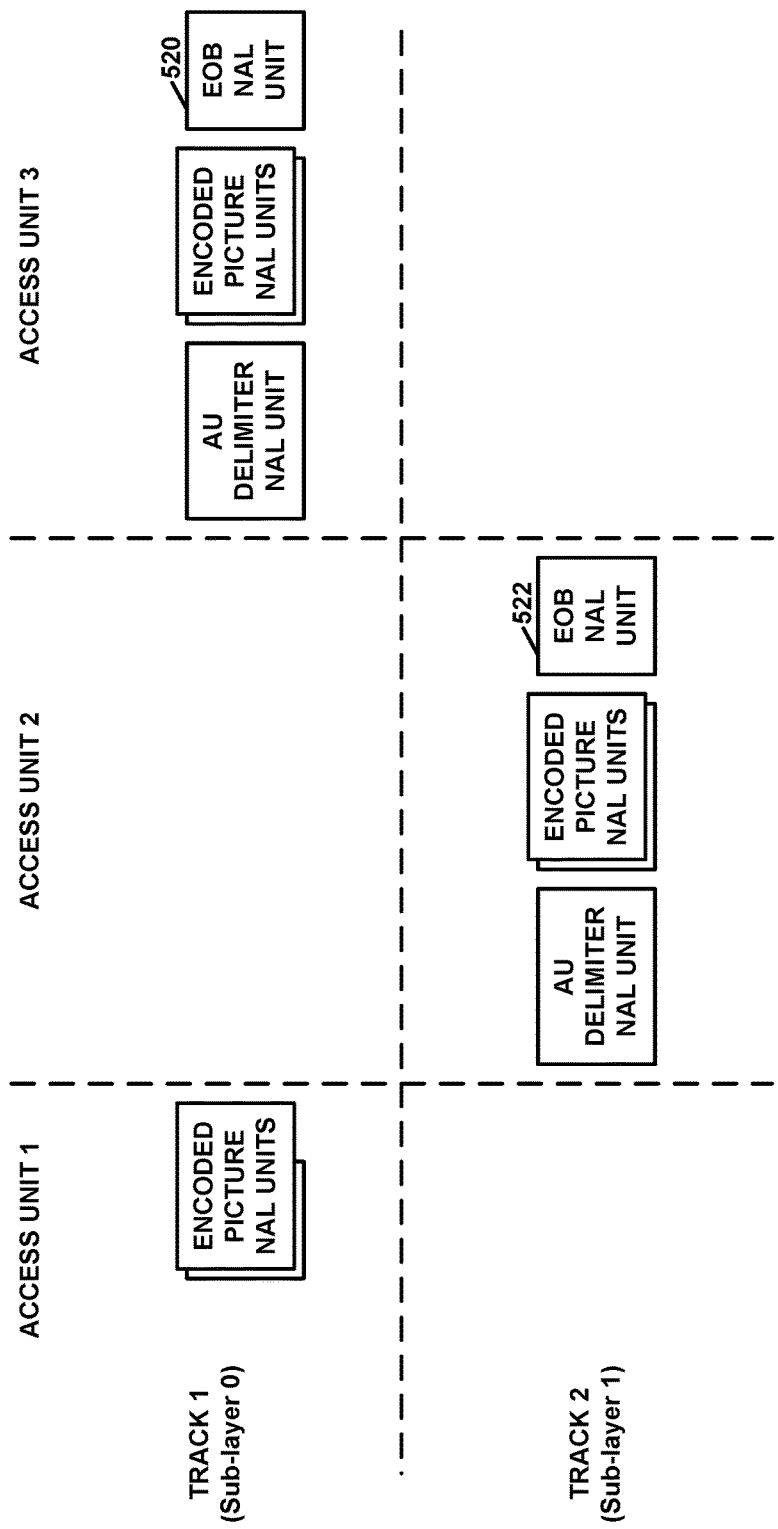
FIG. 8 is a conceptual diagram illustrating an example of End of Bitstream (EOB) NAL units in multiple tracks of a file, in accordance with one or more techniques of this disclosure.

FIG. 8 is a conceptual diagram illustrating an example of EOB NAL units in multiple tracks of a file, in accordance with one or more techniques of this disclosure. In the example of FIG. 8, the file includes two tracks: Track 1 and Track 2. Furthermore, in the example of FIG. 8, track 1 contains NAL units of a first sub-layer (i.e., sub-layer 0) and track 2 contains NAL units of a second sub-layer (i.e., sub-layer 1). The portions of sub-layer 0 and sub-layer 1 shown in the example of FIG. 8 belong to the same bitstream.

In accordance with one or more techniques of this disclosure, EOB NAL units are present in more than one of the tracks of the file (i.e., Track 1 and Track 2). Furthermore, in accordance with one or more techniques of this disclosure, for each respective track, the EOB NAL unit in the respective track is part of the last AU that is within the bitstream. For instance, EOB NAL unit 520 is in the last AU of track 1 that is in the bitstream and EOB NAL unit 522 is in the last AU of track 2 that is the bitstream.

Figure 9A:
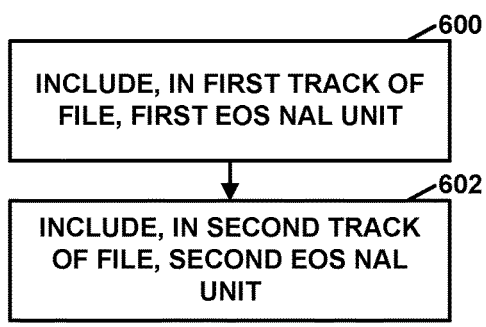
FIG. 9A is a flowchart illustrating an example operation for generating a file that includes EOS NAL units in multiple tracks, in accordance with one or more techniques of this disclosure.

FIG. 9A is a flowchart illustrating an example operation for generating a file that includes EOS NAL units in multiple tracks, in accordance with one or more techniques of this disclosure. The flowcharts of this disclosure are examples. In other examples in accordance with technique of this disclosure, operations may include more, fewer, or different actions, or include actions in different orders.

In the example of FIG. 9A, a computing device (e.g., source device 12 (FIG. 1), file generation device 34 (FIG. 1), post-processing entity 127 (FIG. 3), or another device) may include, in a first track of the file, a first EOS NAL unit for a CVS of a bitstream (600). The first EOS NAL unit is in a first access unit of the CVS. To include a NAL unit (e.g., the first EOS NAL unit) in a track of a file, the device may include the NAL unit in a sample, such as any of samples 305 (FIG. 5) or samples 456 (FIG. 6). In some instances, the device stores the samples in media data boxes, such as media data box 304 (FIG. 5) or media data box 454 (FIG. 6). In other instances, the device stores the sample directly in the file without encapsulating the sample in a media data box. Samples are clustered in the file in "chunks." Furthermore, the device may generate a sample table box in a track box for the track. The sample table box includes a Chunk Offset Box (e.g., a box with identifier 'stco' or 'co64'). A Chunk Offset Box for a track (i.e., a Chunk Offset Box in a sample table box in a track box for a track) includes data specifying starting locations and/or offsets of chunks containing samples of the track. Thus, by generating the Chunk Offset Box to indicate a chunk containing a NAL unit, such as the first EOS NAL unit, file generation device 34 may include the NAL unit in the track. The Chunk Offset Box may specify the starting locations and/or offsets of the chunks relative to a beginning of the file. The sample table box of the track may also include a Sample To Chunk box (e.g., a box with identifier stse). A device may use the Sample To Chunk box to construct a table that indicates which samples are in which chunks. For instance, the table may indicate that samples 20 through 30 are in chunk 2. In addition, the sample table box of the track includes a sample size box (e.g., a box with identifier 'stsz' or 'stz2'). As described in § 8.5.3.1 of ISOBMFF 14996-12, a device may use information in the sample size box to generate a table indicating sizes of samples in the track. Furthermore, each sample may include data indicating the size of each NAL unit in the sample.

Furthermore, in the example of FIG. 9A, the computing device may include, in a second track of the file, a second EOS NAL unit for the CVS (602). In the example of FIG. 9A, the second EOS NAL unit is in a second access unit of the CVS. The second EOS NAL unit is different from the first EOS NAL unit. In other words, the first EOS NAL unit and the second EOS NAL units are separate EOS NAL units. In this example, the first access unit and the second access unit may belong to different temporal sub-layers. An access unit may belong to a temporal sub-layer if a coded picture in the access unit belongs to the temporal sub-layer. The first access unit and the second access unit are associated with different decoding times.

In one example, the computing device may receive the bitstream (e.g., from video encoder 20). In this example, the bitstream includes the first EOS NAL unit but not the second EOS NAL unit. Accordingly, in this example, after receiving the bitstream, the computing device may generate the second EOS NAL unit and may include the second EOS NAL unit in the second track.

To include the second EOS NAL unit in the second track, the device may generate a sample table box, in a track box for the second track, that specifies a sample box containing the second EOS NAL unit.

In some examples, the first track includes a first set of access units of the bitstream for the CVS and the first access unit is a last access unit in order of the first set of access units. Additionally, the second track includes a second set of access units of the bitstream for the CVS and the second access unit is a last access unit in order of the second set of access units. Hence, in this example, for AUs that are within the same CVS of a bitstream (e.g., an HEVC or L-HEVC bitstream) and that belong to different sub-layers stored in multiple tracks, an EOS NAL unit is allowed to be present in more than one of the tracks (e.g., in each of the tracks), as part of the last AU that is within the same CVS in such a track.

Figure 9B:
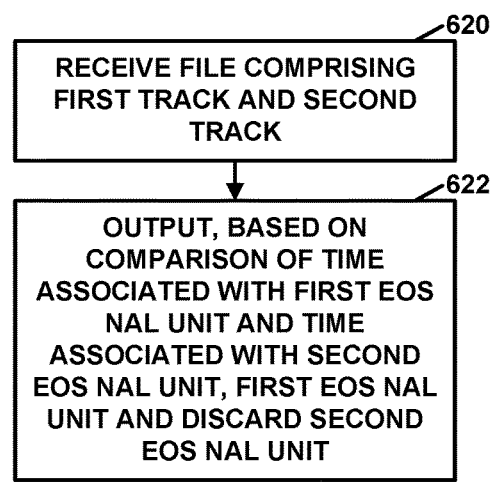
FIG. 9B is a flowchart illustrating an example operation for processing a file that includes EOS NAL units in multiple tracks, in accordance with one or more techniques of this disclosure.

FIG. 9B is a flowchart illustrating an example operation for processing a file that includes EOS NAL units in multiple tracks, in accordance with one or more techniques of this disclosure. In the example of FIG. 9B, a computing device (e.g., destination device 14 (FIG. 1), file parsing unit 177 (FIG. 4), or another computing device) receives a file comprising a first track and a second track (620). In some examples, a network interface, disk drive, processor, or other component of the computing device receives the file. The first track includes a first access unit of a CVS of a bitstream (e.g., an HEVC or L-HEVC bitstream). The second track includes a second access unit of the CVS. In the example of FIG. 9B, the first access unit includes a first EOS NAL unit and the second access unit includes a second EOS NAL unit. The second EOS NAL unit is different from the first EOS NAL unit. In other words, the first EOS NAL unit and the second EOS NAL units are separate EOS NAL units. In this example, the first access unit and the second access unit may belong to different temporal sub-layers. The first access unit and the second access unit are associated with different decoding times.

As shown in the example of FIG. 9B, the computing device may output, based on a comparison of a time associated with the first EOS NAL unit and a time associated with the second EOS NAL unit, the first EOS NAL unit and may discard the second EOS NAL unit (622). In some examples, a network interface, disk drive, processor, or other component of the computing device outputs first EOS NAL unit. In some examples, based on determining that the first EOS NAL unit is associated with a decoding time greater than (i.e., later than) a decoding time associated with the second EOS NAL unit, the computing device outputs the first EOS NAL unit as part of a bitstream reconstructed from NAL units in the file. Furthermore, in some examples, based on determining that the first EOS NAL unit is associated with a decoding time greater than (i.e., later than) a decoding time associated with the second EOS NAL unit, the computing device discards the second EOS NAL unit. Thus, in this example, for AUs that are within the same bitstream and that belong to different sub-layers stored in multiple tracks, when more than one of the tracks contains an EOS NAL unit, only one of the EOS NAL units is kept in the final reconstructed bitstream and other EOS NAL units are discarded. The computing device may place the kept EOS NAL unit after all NAL units, except an EOB NAL unit (when present) in the final reconstructed bitstream. In this example, the decoding time associated with an EOS NAL unit may be the decoding time of the access unit to which the EOS NAL unit belongs.

In various examples, the computing device may perform various additional actions. For instance, the computing device may output NAL units of the CVS in the first track to a video decoder, such as video decoder 30, and output NAL units of the CVS in the second track to the video decoder. The video decoder may decode, based on the NAL units of the CVS in at least one of the first or second tracks, pictures of the CVS. In some examples, the computing device may determine, based on the first access unit including the first EOS NAL unit, that there are no subsequent NAL units of the CVS in the first track. For example, the presence of the first EOS NAL unit may indicate to the computing device that there are no subsequent access units of the CVS stored in the first track. Furthermore, the computing device may determine, based on the second access unit including the second EOS NAL unit, that there are no subsequent access units of the CVS in the second track. For example, the presence of the second EOS NAL unit may indicate to the computing device that there are no subsequent access units of the CVS stored in the second track.

FIG. 10A is a flowchart illustrating an example operation for generating a file that includes EOB NAL units in multiple tracks, in accordance with one or more techniques of this disclosure. In the example of FIG. 10A, a computing device (e.g., source device 12 (FIG. 1), file generation device 34 (FIG. 1), post-processing entity 127 (FIG. 3) or another computing device) includes, in a first track of the file, a first EOB NAL unit for a CVS of a bitstream (650). In the example of FIG. 10A, the first EOB NAL unit is in a first access unit of the CVS. To include the first EOB NAL unit in the first track, the device may generate a sample table box, in a track box for the first track, that specifies a sample box containing the first EOB NAL unit.

Additionally, in the example of FIG. 10A, the computing device includes, in a second track of the file, a second EOB NAL unit for the CVS of the bitstream (652). The second EOB NAL unit is in a second access unit of the CVS. The second EOB NAL unit is different from the first EOB NAL unit. In other words, the first EOB NAL unit and the second EOB NAL units are separate EOB NAL units. The first access unit and the second access unit are associated with different decoding times. In this example, the first access unit and the second access unit belong to different temporal sub-layers. To include the first EOB NAL unit in the first track, the device may generate a sample table box, in a track box for the first track, that specifies a sample box containing the first EOB NAL unit.

In one example, the computing device may receive the bitstream (e.g., from video encoder 20). In this example, the bitstream includes the first EOB NAL unit but not the second EOB NAL unit. Accordingly, in this example, after receiving the bitstream, the computing device may generate the second EOB NAL unit and may include the second EOB NAL unit in the second track.

FIG. 10B is a flowchart illustrating an example operation for processing a file that includes EOB NAL units in multiple tracks, in accordance with one or more techniques of this disclosure. In the example of FIG. 10B, a computing device (e.g., destination device 14 (FIG. 1), file parsing unit 177 (FIG. 4), or another computing device) may receive a file a comprising a first track and a second track (670). In some examples, a network interface, disk drive, processor, or other component of the computing device receives the file. The first track includes a first access unit of a CVS of a bitstream and the second track includes a second access unit of the CVS. In the example of FIG. 10B, the first access unit includes a first EOB NAL unit and the second access unit includes a second EOB NAL unit. The second EOB NAL unit is different from the first EOB NAL unit. In other words, the first EOB NAL unit and the second EOB NAL units are separate EOB NAL units. In this example, the first access unit and the second access unit may belong to different temporal sub-layers. The first access unit and the second access unit are associated with different decoding times.

Furthermore, in the example of FIG. 10B, the computing device outputs (e.g., to a video decoder such as video decoder 30) the first EOB NAL unit and discards the second EOB NAL unit (672). In some examples, a network interface, disk drive, processor, or other component of the computing device outputs the first EOB NAL unit. In some examples, the computing device outputs the first EOB NAL unit as part of a bitstream reconstructed from NAL units in the file. In some examples, based on determining that the first access unit is associated with a decoding time greater than (i.e., later than) a decoding time associated with the second access unit, the computing device discards the second EOB NAL unit. Thus, in this example, for access units that are within the same CVS of a bitstream and that belong to different sub-layers stored in multiple tracks, when more than one of the tracks contains an EOB NAL unit, only one of the EOB NAL units is kept in the final reconstructed bitstream and other EOB NAL units are discarded. The computing device may place the kept EOB NAL unit at the end of the last of the access unit in the final reconstructed bitstream. In this example, the decoding time associated with an EOB NAL unit may be the decoding time of the access unit to which the EOB NAL unit belongs.

In various examples, the computing device may perform various additional actions. For instance, the computing device may output NAL units of the CVS in the first track to a video decoder, such as video decoder 30, and may output NAL units of the CVS in the second track to the video decoder. The video decoder may decode, based on the NAL units of the CVS in at least one of the first or second tracks, pictures of the CVS. In some examples, the computing device may determine, based on the first access unit including the first EOB NAL unit, that there are no subsequent NAL units of the bitstream stored in the first track. Additionally, the computing device may determine, based on the second access unit including the second EOB NAL unit, that there are no subsequent NAL units of the bitstream stored in the second track.

In one or more examples, the functions described may be implemented in hardware, software, firmware, or any combination thereof. If implemented in software, the functions may be stored on or transmitted over, as one or more instructions or code, a computer-readable medium and executed by a hardware-based processing unit. Computer-readable media may include computer-readable storage media, which corresponds to a tangible medium such as data storage media, or communication media including any medium that facilitates transfer of a computer program from one place to another, e.g., according to a communication protocol. In this manner, computer-readable media generally may correspond to (1) tangible computer-readable storage media which is non-transitory or (2) a communication medium such as a signal or carrier wave. Data storage media may be any available media that can be accessed by one or more computers or one or more processors to retrieve instructions, code and/or data structures for implementation of the techniques described in this disclosure. A computer program product may include a computer-readable medium.

By way of example, and not limitation, such computer-readable storage media can comprise RAM, ROM, EEPROM, CD-ROM or other optical disk storage, magnetic disk storage, or other magnetic storage devices, flash memory, or any other medium that can be used to store desired program code in the form of instructions or data structures and that can be accessed by a computer. Also, any connection is properly termed a computer-readable medium. For example, if instructions are transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. It should be understood, however, that computer-readable storage media and data storage media do not include connections, carrier waves, signals, or other transient media, but are instead directed to non-transient, tangible storage media. Disk and disc, as used herein, includes compact disc (CD), laser disc, optical disc, digital versatile disc (DVD), floppy disk and Blu-ray disc, where disks usually reproduce data magnetically, while discs reproduce data optically with lasers. Combinations of the above should also be included within the scope of computer-readable media.

Instructions may be executed by one or more processors, such as one or more digital signal processors (DSPs), general purpose microprocessors, application specific integrated circuits (ASICs), field programmable logic arrays (FPGAs), or other equivalent integrated or discrete logic circuitry. Accordingly, the term "processor," as used herein may refer to any of the foregoing structure or any other structure suitable for implementation of the techniques described herein. In addition, in some aspects, the functionality described herein may be provided within dedicated hardware and/or software modules configured for encoding and decoding, or incorporated in a combined codec. Also, the techniques could be fully implemented in one or more circuits or logic elements.

The techniques of this disclosure may be implemented in a wide variety of devices or apparatuses, including a wireless handset, an integrated circuit (IC) or a set of ICs (e.g., a chip set). Various components, modules, or units are described in this disclosure to emphasize functional aspects of devices configured to perform the disclosed techniques, but do not necessarily require realization by different hardware units. Rather, as described above, various units may be combined in a codec hardware unit or provided by a collection of interoperative hardware units, including one or more processors as described above, in conjunction with suitable software and/or firmware.

Various examples have been described. These and other examples are within the scope of the following claims.

What is claimed is:

1. A method of generating a file for storage of video contents, the method comprising:
   including, in a first track of the file, a first end of sequence (EOS) network abstraction layer (NAL) unit for a coded video sequence (CVS) of a bitstream, wherein the first track includes a first set of access units of the bitstream for the CVS, the first set of access units includes a first access unit that includes the first EOS NAL unit, the first access unit belongs to a first temporal sub-layer, and the first access unit is a last access unit of the CVS in order of the first set of access units; and
   including, in a second track of the file, a second EOS NAL unit for the same CVS, wherein the second track includes a second set of access units of the bitstream for the CVS, the second set of access units includes a second access unit that includes the second EOS NAL unit, the second EOS NAL unit is different from the first EOS NAL unit, the second access unit belongs to a second temporal sub-layer different from the first temporal sub-layer, and the second access unit is a last access unit of the CVS in order of the second set of access units.

2. The method of claim 1, wherein the bitstream is a high efficiency video coding (HEVC) bitstream or a layered-HEVC bitstream.

3. A device for generating a file for storage of video contents, the device comprising:
   a memory configured to store the file for storage of video contents; and
   one or more processors configured to:
      include, in a first track of the file, a first end of sequence (EOS) network abstraction layer (NAL) unit for a coded video sequence (CVS) of a bitstream, wherein the first track includes a first set of access units of the bitstream for the CVS, the first set of access units includes a first access unit that includes the first EOS NAL unit, the first access unit belongs to a first temporal sub-layer, and the first access unit is a last access unit of the CVS in order of the first set of access units; and
      include, in a second track of the file, a second EOS NAL unit for the same CVS, wherein the second track includes a second set of access units of the bitstream for the CVS, the second set of access units includes a second access unit that includes the second EOS NAL unit, the second EOS NAL unit is different from the first EOS NAL unit, the second access unit belongs to a second temporal sub-layer different from the first temporal sub-layer, and the second access unit is a last access unit of the CVS in order of the second set of access units.

4. The device of claim 3, wherein the bitstream is a high efficiency video coding (HEVC) bitstream or a layered-HEVC bitstream.

5. A device for generating a file for storage of video contents, the device comprising:
   means for including, in a first track of the file, a first end of sequence (EOS) network abstraction layer (NAL) unit for a coded video sequence (CVS) of a bitstream, wherein the first track includes a first set of access units of the bitstream for the CVS, the first set of access units includes a first access unit that includes the first EOS NAL unit, the first access unit belongs to a first temporal sub-layer, and the first access unit is a last access unit of the CVS in order of the first set of access units; and
   means for including, in a second track of the file, a second EOS NAL unit for the same CVS, wherein the second track includes a second set of access units of the bitstream for the CVS, the second set of access units includes a second access unit that includes the second EOS NAL unit, the second EOS NAL unit is different from the first EOS NAL unit, the second access unit belongs to a second temporal sub-layer different from the first temporal sub-layer, and the second access unit is a last access unit of the CVS in order of the second set of access units.

6. A non-transitory computer-readable storage medium having instructions stored thereon that, when executed, cause a computing device to:
   include, in a first track of the file, a first end of sequence (EOS) network abstraction layer (NAL) unit for a coded video sequence (CVS) of a bitstream, wherein the first track includes a first set of access units of the bitstream for the CVS, the first set of access units includes a first access unit that includes the first EOS NAL unit, the first access unit belongs to a first temporal sub-layer, and the first access unit is a last access unit of the CVS in order of the first set of access units; and
   include, in a second track of the file, a second EOS NAL unit for the same CVS, wherein the second track includes a second set of access units of the bitstream for the CVS, the second set of access units includes a second access unit that includes the second EOS NAL unit, the second EOS NAL unit is different from the first EOS NAL unit, the second access unit belongs to a second temporal sub-layer different from the first temporal sub-layer, and the second access unit is a last access unit of the CVS in order of the second set of access units.

* * * * *